US012746768B2

(12) United States Patent
Abe et al.

(10) Patent No.: US 12,746,768 B2
(45) Date of Patent: Sep. 29, 2026

(54) CARRIAGE APPARATUS, PRINTING APPARATUS, AND CONTROL METHOD THEREOF

(71) Applicant: CANON KABUSHIKI KAISHA, Tokyo (JP)

(72) Inventors: Tomohito Abe, Kanagawa (JP); Ryutaro Takahashi, Tokyo (JP); Naoaki Wada, Kanagawa (JP); Daigo Kuronuma, Kanagawa (JP); Kenta Iimura, Kanagawa (JP); Ryohei Maruyama, Kanagawa (JP); Masakazu Nagashima, Kanagawa (JP); Toshiaki Yamaguchi, Tokyo (JP); Takahiro Daikoku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 19/080,393

(22) Filed: Mar. 14, 2025

(65) Prior Publication Data

US 2025/0242616 A1 Jul. 31, 2025

Related U.S. Application Data

(63) Continuation of application No. 17/488,971, filed on Sep. 29, 2021, now abandoned.

(30) Foreign Application Priority Data

Sep. 30, 2020 (JP) ................................ 2020-166108

(51) Int. Cl.
*B41J 19/20* (2006.01)
*B41J 25/00* (2006.01)
(Continued)

(52) U.S. Cl.
CPC ........... *B41J 19/207* (2013.01); *B41J 19/202* (2013.01); *H02P 5/46* (2013.01); *B41J 25/001* (2013.01); *B41J 29/46* (2013.01); *H02P 8/14* (2013.01)

(58) Field of Classification Search
CPC ...... B41J 19/202; B41J 19/207; B41J 25/001; B41J 29/46; H02P 5/46; H02P 8/14
See application file for complete search history.

(56) References Cited

U.S. PATENT DOCUMENTS 3,373,435 A 3/1968 Strong
3,908,809 A 9/1975 Beattie
(Continued)

FOREIGN PATENT DOCUMENTS

JP 5-00444 U 1/1993
JP 11-58703 A 3/1999
(Continued)

OTHER PUBLICATIONS

Office Action dated Aug. 2, 2022, in Russian Patent Application No. 2021128256.

(Continued)

*Primary Examiner* — Jill E Culler
(74) *Attorney, Agent, or Firm* — Venable LLP

(57) ABSTRACT

A carriage apparatus includes a carriage configured to reciprocally move in a predetermined direction, a first motor arranged on a side of one end of a range of movement of the carriage and configured to drive the carriage, a second motor arranged on a side of the other end of the range of movement of the carriage, configured to drive the carriage, and having the same kind of driving characteristics as driving characteristics of the first motor, a detector for detecting a position of the carriage related to the predetermined direction, and a controller for controlling driving of the first motor and the (Continued)

second motor by feeding back a detection result detected by the detector.

20 Claims, 18 Drawing Sheets

(51) Int. Cl.

| | |
|---|---|
| ***B41J 29/46*** | (2006.01) |
| ***H02P 5/46*** | (2006.01) |
| ***H02P 8/14*** | (2006.01) |

(56) References Cited

U.S. PATENT DOCUMENTS

| | | | |
|---|---|---|---|
| 4,288,168 | A | 9/1981 | Mayr et al. |
| 6,390,968 | B1 | 5/2002 | Yoshida et al. |
| 6,418,274 | B2 * | 7/2002 | Tanaka .................. H02P 7/2805 318/602 |
| 6,587,038 | B2 * | 7/2003 | Cheng ...................... B41J 29/46 340/384.1 |
| 6,921,147 | B2 | 7/2005 | Mitarai et al. |
| 6,923,535 | B2 | 8/2005 | Koga |
| 7,878,625 | B2 | 2/2011 | van Kalmthout et al. |
| 11,305,564 | B2 | 4/2022 | Fernandez Vazquez et al. |
| 11,442,391 | B2 | 9/2022 | Sugiyama et al. |
| 12,077,006 | B2 | 9/2024 | Takahashi et al. |
| 2001/0008380 | A1 | 7/2001 | Kruecke |
| 2002/0097016 | A1 | 7/2002 | Tanaka et al. |
| 2003/0206212 | A1 | 11/2003 | Mitarai et al. |
| 2009/0066750 | A1 | 3/2009 | Beltman et al. |

FOREIGN PATENT DOCUMENTS

| | | | |
|---|---|---|---|
| JP | 2001-270180 | A | 10/2001 |
| JP | 2003-320725 | A | 11/2003 |
| JP | 3604994 | B2 | 12/2004 |
| JP | 2008-018647 | A | 1/2008 |
| JP | 2010-247401 | A | 11/2010 |
| JP | 2011-176901 | A | 9/2011 |
| JP | 2012-035488 | A | 2/2012 |
| JP | 2013-193350 | A | 9/2013 |
| JP | 2020-054142 | A | 4/2020 |

OTHER PUBLICATIONS

Extended European Search Report dated Feb. 15, 2022, in European Patent Application No. 21198774.8.

Office Action dated Mar. 14, 2023, in Chinese Patent Application No. 202111135676.8.

Office Action dated May 17, 2024, in Japanese Patent Application No. 2020-166108.

Office Action dated Jul. 17, 2024, in Korean Patent Application No. 10-2021-0127870.

* cited by examiner

FIG. 7

| Reset | PWM | DIR | H1 | H2 | H3 | LA | LB | LC | HA | HB | HC |
|---|---|---|---|---|---|---|---|---|---|---|---|
| 0 | 0 | 1 | 1 | 0 | 1 | 1 | 0 | 1 | 1 | 0 | 0 |
| 0 | 1 | 1 | 1 | 0 | 1 | 0 | 0 | 1 | 1 | 0 | 0 |
| 0 | 0 | 1 | 1 | 0 | 0 | 0 | 1 | 1 | 0 | 1 | 0 |
| 0 | 1 | 1 | 1 | 0 | 0 | 0 | 0 | 1 | 0 | 1 | 0 |
| 0 | 0 | 1 | 1 | 1 | 0 | 1 | 1 | 0 | 0 | 1 | 0 |
| 0 | 1 | 1 | 1 | 1 | 0 | 1 | 0 | 0 | 0 | 1 | 0 |
| 0 | 0 | 1 | 0 | 1 | 0 | 1 | 0 | 1 | 0 | 0 | 1 |
| 0 | 1 | 1 | 0 | 1 | 0 | 1 | 0 | 0 | 0 | 0 | 1 |
| 0 | 0 | 1 | 0 | 1 | 1 | 0 | 1 | 1 | 0 | 0 | 1 |
| 0 | 1 | 1 | 0 | 1 | 1 | 0 | 1 | 0 | 0 | 0 | 1 |
| 0 | 0 | 1 | 0 | 0 | 1 | 1 | 1 | 0 | 1 | 0 | 0 |
| 0 | 1 | 1 | 0 | 0 | 1 | 0 | 1 | 0 | 1 | 0 | 0 |
| 0 | 0 | 0 | 1 | 0 | 1 | 1 | 0 | 1 | 0 | 0 | 1 |
| 0 | 1 | 0 | 1 | 0 | 1 | 1 | 0 | 0 | 0 | 0 | 1 |
| 0 | 0 | 0 | 1 | 0 | 0 | 0 | 1 | 1 | 0 | 0 | 1 |
| 0 | 1 | 0 | 1 | 0 | 0 | 0 | 1 | 0 | 0 | 0 | 1 |
| 0 | 0 | 0 | 1 | 1 | 0 | 1 | 1 | 0 | 1 | 0 | 0 |
| 0 | 1 | 0 | 1 | 1 | 0 | 0 | 1 | 0 | 1 | 0 | 0 |
| 0 | 0 | 0 | 0 | 1 | 0 | 1 | 0 | 1 | 1 | 0 | 0 |
| 0 | 1 | 0 | 0 | 1 | 0 | 0 | 0 | 1 | 1 | 0 | 0 |
| 0 | 0 | 0 | 0 | 1 | 1 | 0 | 1 | 1 | 0 | 1 | 0 |
| 0 | 1 | 0 | 0 | 1 | 1 | 0 | 0 | 1 | 0 | 1 | 0 |
| 0 | 0 | 0 | 0 | 0 | 1 | 1 | 1 | 0 | 0 | 1 | 0 |
| 0 | 1 | 0 | 0 | 0 | 1 | 1 | 0 | 0 | 0 | 1 | 0 |

CARRIAGE APPARATUS, PRINTING APPARATUS, AND CONTROL METHOD THEREOF

BACKGROUND OF THE INVENTION

Field of the Invention

The present invention relates to a carriage apparatus, a printing apparatus, and a control method thereof and, more particularly to, for example, a printing apparatus that performs printing by discharging ink to a print medium while reciprocally scanning a carriage on which an inkjet printhead is mounted, and a method of controlling the printing apparatus.

Description of the Related Art

In recent years, there is increasing demand for improved productivity and the image quality of inkjet printing apparatuses that perform printing by reciprocally moving a carriage on which a printhead is mounted and discharging ink from the printhead to a print medium such as a print sheet. More specifically, although a printhead increasingly tends to have a longer printing width and a higher nozzle packing density and the weight of the printhead has increased accordingly, there is demand for a carriage which incorporates such a printhead to be driven at a high speed and with accuracy.

There has been mainly employed, as a method of driving such a carriage, a method of scanning a carriage by arranging a large motor with a high output at the end on one side and a driven pulley at the end on the other side of a range of movement of the carriage and suspending a timing belt between the motor and the driven pulley. However, in general, since the market distribution scale of a high output motor is small, the cost of a high output motor tends to greatly increase. To solve this problem, a carriage driving method in which a DC motor is installed on the end on one side and a stepper motor is installed on the end on the other side of the range of movement of a carriage has been proposed (Japanese Patent No. 3604994).

However, in the related-art described above, control commands corresponding to the respective characteristics of the DC motor and the stepper motor need to be provided. In this manner, the control method becomes complicated if different types of motors are to be used to drive a heavyweight carriage at a high speed and with accuracy, and it becomes difficult to obtain good control responsiveness and good control stability.

SUMMARY OF THE INVENTION

The present invention provides a carriage apparatus, a printing apparatus, and a control method thereof that allow a carriage to be driven without complicating the control method.

One of the aspects of the present invention provides a carriage apparatus characterized by comprising a carriage configured to reciprocally move in a predetermined direction, a first motor arranged on a side of one end of a range of movement of the carriage and configured to drive the carriage, a second motor arranged on a side of the other end of the range of movement of the carriage, configured to drive the carriage, and has the same kind of driving characteristics as driving characteristics of the first motor, detection means for detecting a position of the carriage related to the predetermined direction, and control means for controlling driving of the first motor and the second motor by feeding back a detection result detected by the detection means.

Further features of the present invention will become apparent from the following description of exemplary embodiments (with reference to the attached drawings).

BRIEF DESCRIPTION OF THE DRAWINGS

FIG. 7 is a view showing a truth table of control signals of the control unit 102;

DESCRIPTION OF THE EMBODIMENTS

Figure 1A:
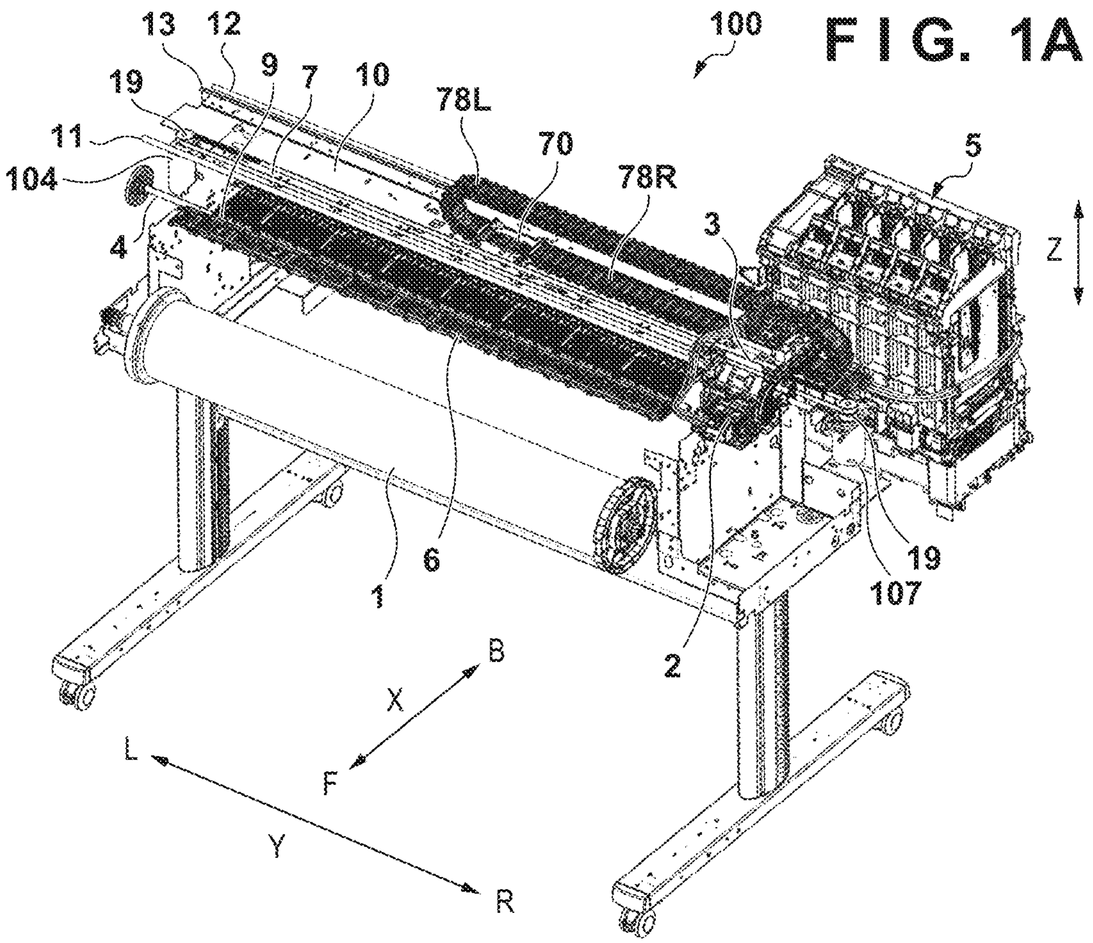
FIGS. 1A and 1B are external perspective views each showing a schematic arrangement of an inkjet printing apparatus according to a representative embodiment of the present invention.

Preferred embodiments of the present invention will be further described in detail with reference to the accompanying drawings. Note that the following embodiments do not limit the invention according to the scope of the appended claims. Although a plurality of features are described in the embodiments, not all of the features are essential to the invention and the plurality of features may arbitrarily be combined. Furthermore the same reference numerals denote the same or similar parts in the accompanying drawings, and a repetitive description thereof will be omitted.

Note that in this specification, the term "printing" (to be also referred to as "print" hereinafter) not only includes the formation of significant information such as characters and graphics, regardless of whether they are significant or insignificant. Furthermore, it broadly includes the formation of images, figures, patterns, and the like on a print medium, or the processing of the medium, regardless of whether they are so visualized as to be visually perceivable by humans.

In addition, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to also be referred to as a "liquid" hereinafter) should be extensively interpreted similarly to the definition of "printing (print)" described above. That is, "ink" includes a liquid which, when applied onto a print medium, can form images, figures, patterns, and the like, can process the print medium, or can process ink (for example, solidify or insolubilize a coloring material contained in ink applied to the print medium).

Further, a "nozzle" generically means an orifice or a liquid channel communicating with it, and an element for generating energy used to discharge ink, unless otherwise specified.

<Outline of Printing Apparatus (FIGS. 1A, 1B, and 2)>

Figure 1B:
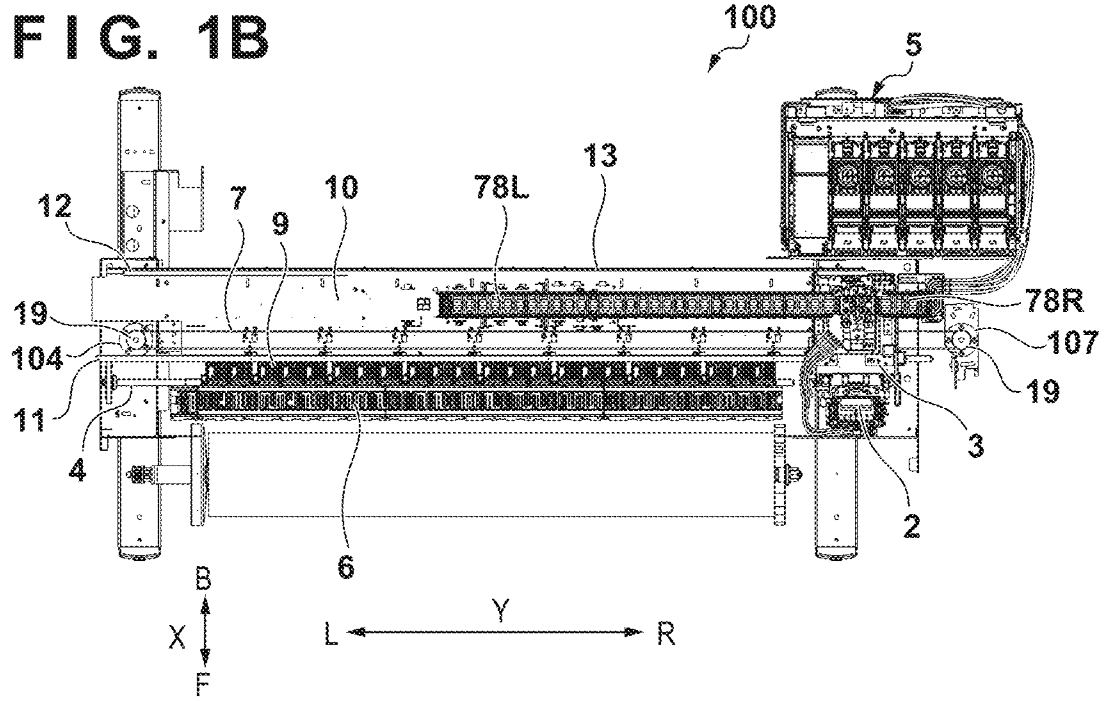

FIGS. 1A and 1B are outer appearance views showing the schematic arrangement of an inkjet printing apparatus according to a representative embodiment of the present invention. FIG. 1A shows a perspective view showing the schematic arrangement of an inkjet printing apparatus 100 (to be referred to as a printing apparatus hereinafter), and FIG. 1B shows a top view thereof.

Figure 2:
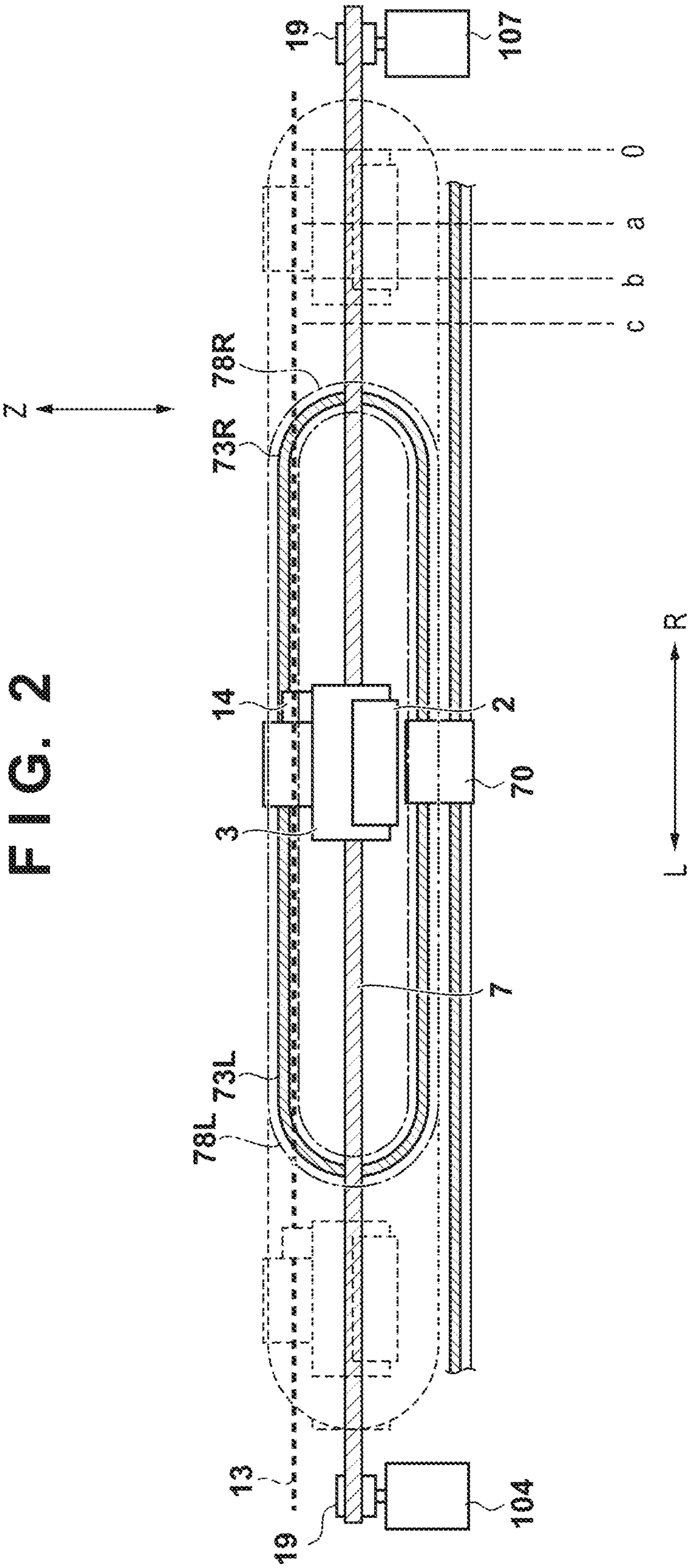
FIG. 2 is an explanatory view showing a structure of a periphery of a carriage of the printing apparatus.

In addition, FIG. 2 is an explanatory view showing the structure of the periphery of a carriage of the printing apparatus.

In FIGS. 1A, 1B, and 2, arrows X, Y, and Z indicate the front-and-rear direction (a depth direction), the left-and-right direction (widthwise direction as the longitudinal direction of the apparatus), and the upper-and-lower direction (the vertical direction or the direction of gravity), respectively. In addition, "F", "B", "L", and "R" indicate the front side, the rear side, the left side, and the right side, respectively.

The printing apparatus 100 includes a printing unit including a printhead 2 and a carriage 3. A plurality of discharge orifices (nozzles) are formed on the printhead 2, and a plurality of channels are formed in the printhead 2 so as to communicate with the respective discharge orifices. An inkjet-method energy generating element such as a heater, a piezoelectric element, or the like is arranged in each of the plurality of channels, and ink droplets are discharged from the corresponding discharge orifice by the inkjet method. Ink tanks 5 containing inks to be supplied to the printhead 2 are arranged in positions separate from the printing unit. Note that the printing method is not limited to the inkjet method, and a printhead of another printing method may also be used.

A carriage motor 104 and a carriage motor 107 each connected to a driving pulley 19 are arranged at both ends of a range of movement of the carriage 3. A description will be made here by assuming that the carriage motor 104 and the carriage motor 107 arranged at both ends have similar characteristics including the driving pulleys 19. A timing belt 7 is suspended and arranged between the two carriage motors, and the carriage 3 is attached to a part of the timing belt 7. The carriage 3 can be made to scan by these components. By using two carriage motors to drive the carriage 3 in this manner, it will be possible to increase the output more than when a carriage is driven by a single carriage motor, and even a heavyweight carriage will be able to be scanned at a high speed.

The printing apparatus 100 also includes a position detection mechanism for detecting the position of the carriage 3. Such a position detection mechanism includes a linear scale 13 extending in a carriage scanning direction and an encoder sensor 14 which is mounted on the carriage 3 and reads slits provided in the linear scale 13. The position control/speed control of the carriage 3 can be performed by feeding back an encoder signal detected by this position detection mechanism.

The carriage 3 on which the printhead 2 is mounted is guided by a guide rail 11 and a guide rail 12 and is supported by a main body of the printing apparatus 100. The guide rail 11 and the guide rail 12 are supported by a main body frame 10. The carriage 3 reciprocally moves along an extending direction of the guide rail 11 and the guide rail 12. A direction in which the carriage 3 is scanned toward the L side and a direction in which the carriage 3 is scanned toward the R side in FIGS. 1A, 1B, and 2 will be described as "a forward direction" and "a reverse direction", respectively, hereinafter. In addition, regardless of the forward direction and the reverse direction, a direction in which the carriage 3 moves will be referred to as a main scanning direction.

A rolled sheet 1 as a print medium is set in a sheet feeding unit. The printing apparatus 100 includes a conveyance roller 4 which is rotationally driven and a pinch roller 9 which rotates by being driven by the conveyance roller 4. A platen 6 supports the sheet 1 in a position facing the printing unit. The sheet 1 is conveyed in a state in which the sheet 1 is sandwiched between the conveyance roller 4 and the pinch roller 9. A printing operation of discharging ink toward the sheet 1 on the platen 6 while the carriage 3 on which the printhead 2 is mounted is moved in the main scanning direction, and a conveying operation of conveying the sheet 1 in a sheet conveyance direction (sub-scanning direction) stepwise are performed. An image is printed on a sheet in accordance with a serial printing method by repetitively performing the printing operation and the conveying operation.

Note that the reference of the carriage 3 and the sheet is set on the side of the ink tanks 5. That is, the position of the end portion of the sheet on the refence side will not change even if the width of the sheet changes. In addition, a recovery unit 120 is arranged on the reference side. The recovery unit 120 includes a cap 121 for sealing the surfaces of discharge orifices formed in the printhead 2. An in-cap absorbing member is provided in the cap 121 to receive and absorb ink discharged during a preliminary ink discharge operation (preliminary discharge) performed to prevent discharge failure of the printhead 2.

Figure 18:
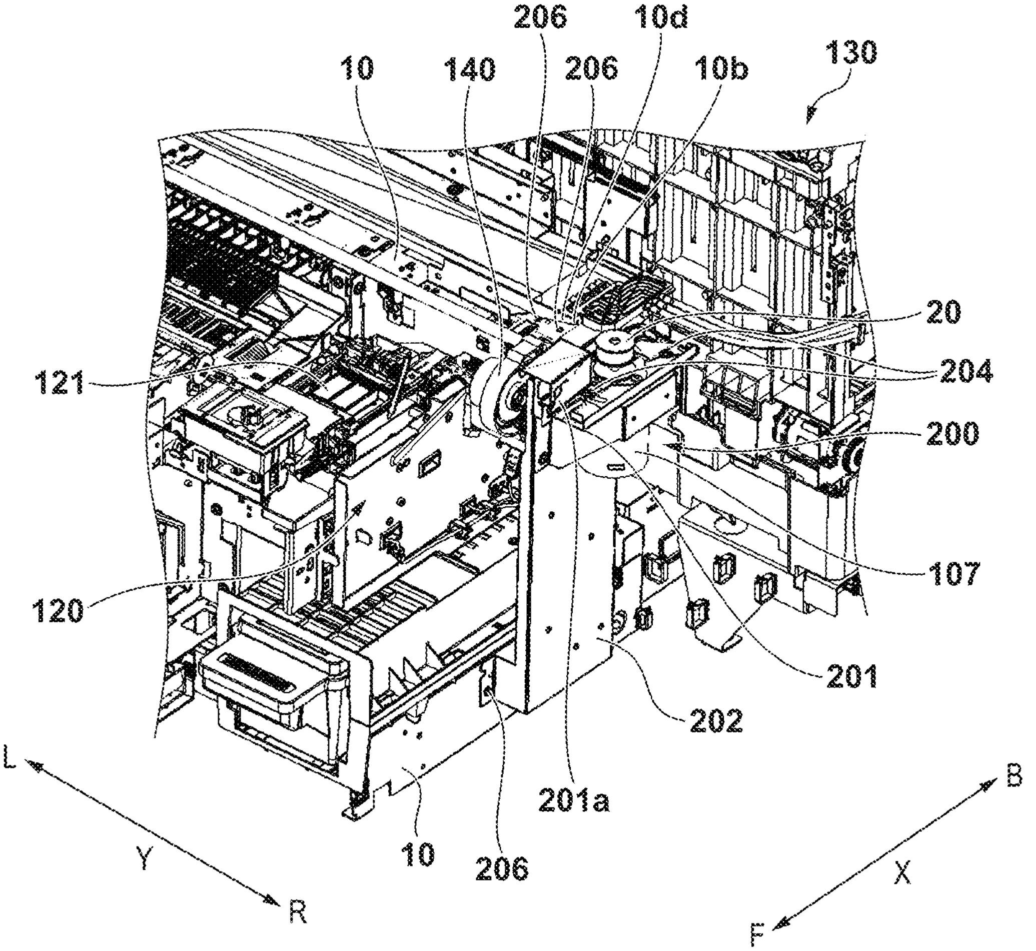
FIG. 18 is a perspective view showing the structure near the recovery unit of the printing apparatus shown in FIG. 1, and is a view showing a state in which the recovery unit has been removed from the printing apparatus.

FIG. 18 is a perspective view showing a structure near the recovery unit 120 of the printing apparatus 100 shown in FIG. 1. FIG. 18 shows a state in which the recovery unit 120 is attached to the printing apparatus 100.

The cap 121 for sealing the surfaces of the discharge orifices formed on the printhead 2 is provided on the recovery unit 120 as described above. An in-cap absorbing member is provided in the cap 121 to receive and absorb ink discharged during a preliminary ink discharge operation (preliminary discharge) performed to prevent discharge failure of the printhead 2.

The cap 121 is connected to a suction pump and a tube, and sucks ink or air from the surfaces of the discharge orifices of the printhead 2, as needed, to clean the discharge orifices and to remove air accumulated in the printhead. A wiper member is also provided to remove ink or dirt that has adhered to the surfaces of the discharge orifices of the printhead 2. In addition, a discharge failure detection unit is arranged beside the recovery unit 120, and the discharge failure detection unit includes a sensor for detecting whether ink is being correctly discharged from each discharge orifice of the printhead 2.

Since the recovery unit 120 will perform a recovery operation on the printhead 2 which is mounted on the carriage 3, the recovery unit 120 will be arranged outside the width of a sheet 1 but also be arranged inside the scanning range of the carriage 3. As shown in FIG. 18, a motor support member 201 is attached to a motor attachment plate 202, and is formed to be integrally attachable/detachable as a tension applying unit 200 for applying tension to the timing belt 7. In addition, the tension applying unit 200 is fixed to the main body frame by screws 206. Also, a protruding shape **10*b* and a protruding shape 10*d* are provided in the motor attachment plate 202. The tension applying unit 200 also includes the carriage motor 107 and is arranged outside the scanning range of the carriage 3**.

Hence, as shown in FIG. 18, the tension applying unit 200 is arranged outside the recovery unit 120, which is arranged inside the scanning range of the carriage 3, and the tension applying unit 200 is fixed to the main body frame by the screws 206. Furthermore, as is obvious from FIG. 18, the ink tanks 5 and the recovery unit 120 are arranged on the reference side of the carriage 3.

Each of a tube 73R and a tube 73L is a tube formed by a plurality of flexible ink tubes for supplying inks of a plurality of colors from the ink tanks 5 fixed to the side of the main body of the printing apparatus 100 to the printhead 2 on the carriage 3. The tube 73R is provided so that its R side will be U-shaped in the Y direction by fixing its one end to the carriage 3 and its other end to a connecting member 70 which is fixed to the side of the main body of the printing apparatus 100. In a similar manner, the tube 73L is also provided so that its L side will be U-shaped in the Y direction. In this example, the tube 73R and the tube 73L are installed to have the same number of bundled tubes, the same length, the same material, and the like as each other, and have only different curving directions from each other.

In addition, to guide the deformation of the tube 73R and the tube 73L which accompanies the reciprocal movement of the carriage 3, the printing apparatus 100 includes tube holding members 78R and 78L. In this example, each tube holding member is a chain link (cable carrier) formed by connecting a plurality of link members. Each link member is a ring-shaped member in which a tube can be inserted, and adjacent link members are pivotably connected to each other about an axis in the X direction. Each of the tube holding members 78R and 78L is curved in a U shape in the Y direction and deforms by changing a curving portion so as to follow the reciprocal movement of the carriage 3. In this example, the tube holding members 78R and 78L have the same number of connected link members. The tube 73R is inserted in the tube holding member 78R, and the tube 73L is inserted in the tube holding member 78L.

Several embodiments of a more specific method for driving the carriage 3 by using the printing apparatus 100 according to the above-described arrangement will be described next.

First Embodiment

Figure 3:
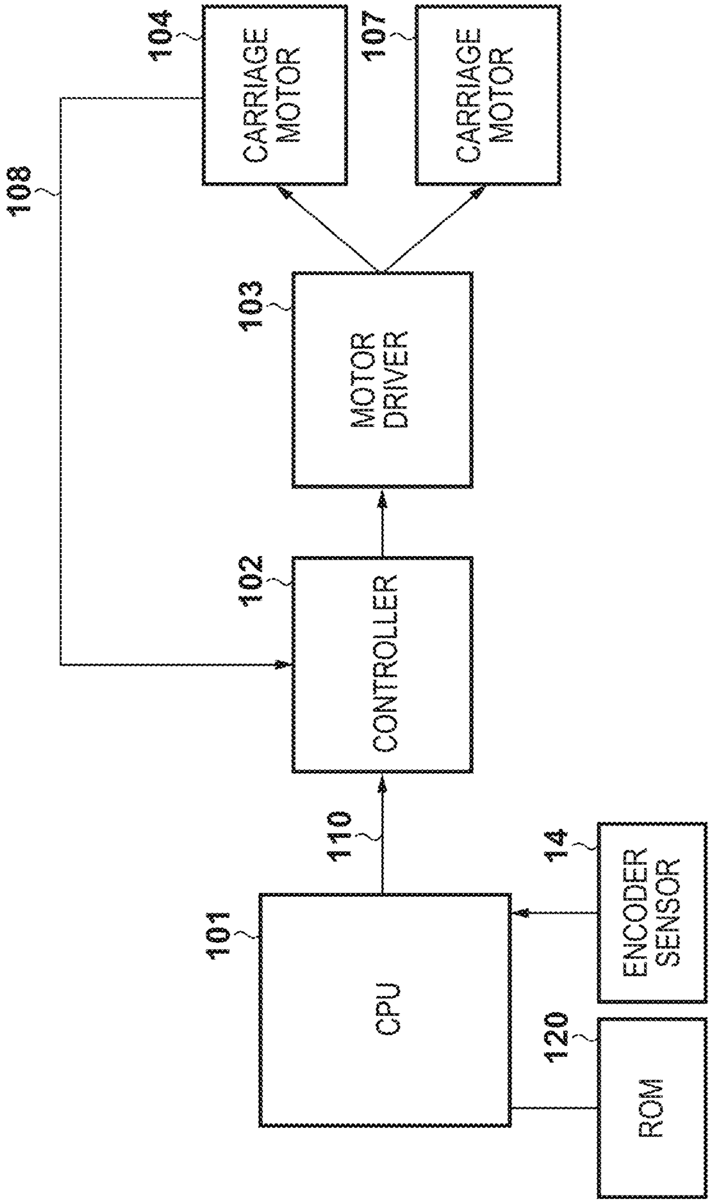
FIG. 3 is a block diagram showing a motor control arrangement of a printing apparatus according to the first embodiment.

FIG. 3 is a block diagram showing the motor control arrangement of a printing apparatus according to the first embodiment.

A carriage motor 104 and a carriage motor 107 shown in FIG. 3 are brushless DC motors. A CPU 101 controls, via a control line 110, a control unit (controller) 102 based on a signal from a common encoder sensor 14. Also, the control unit 102 controls a driving unit (motor driver) 103 based on signals from the control line 110 and phase information 108 from the carriage motor 104. Subsequently, each of the carriage motor 104 and the carriage motor 107 performs a predetermined operation based on a driving signal from the driving unit 103. A ROM 120 stores pieces of information that indicate the speed of acceleration/deceleration corresponding to the print medium or a print mode, a constant speed, a distance until a stop, and the like.

Details of the motor control arrangement shown in FIG. 3 will be described next with reference to FIGS. 4 to 7.

Figure 4:
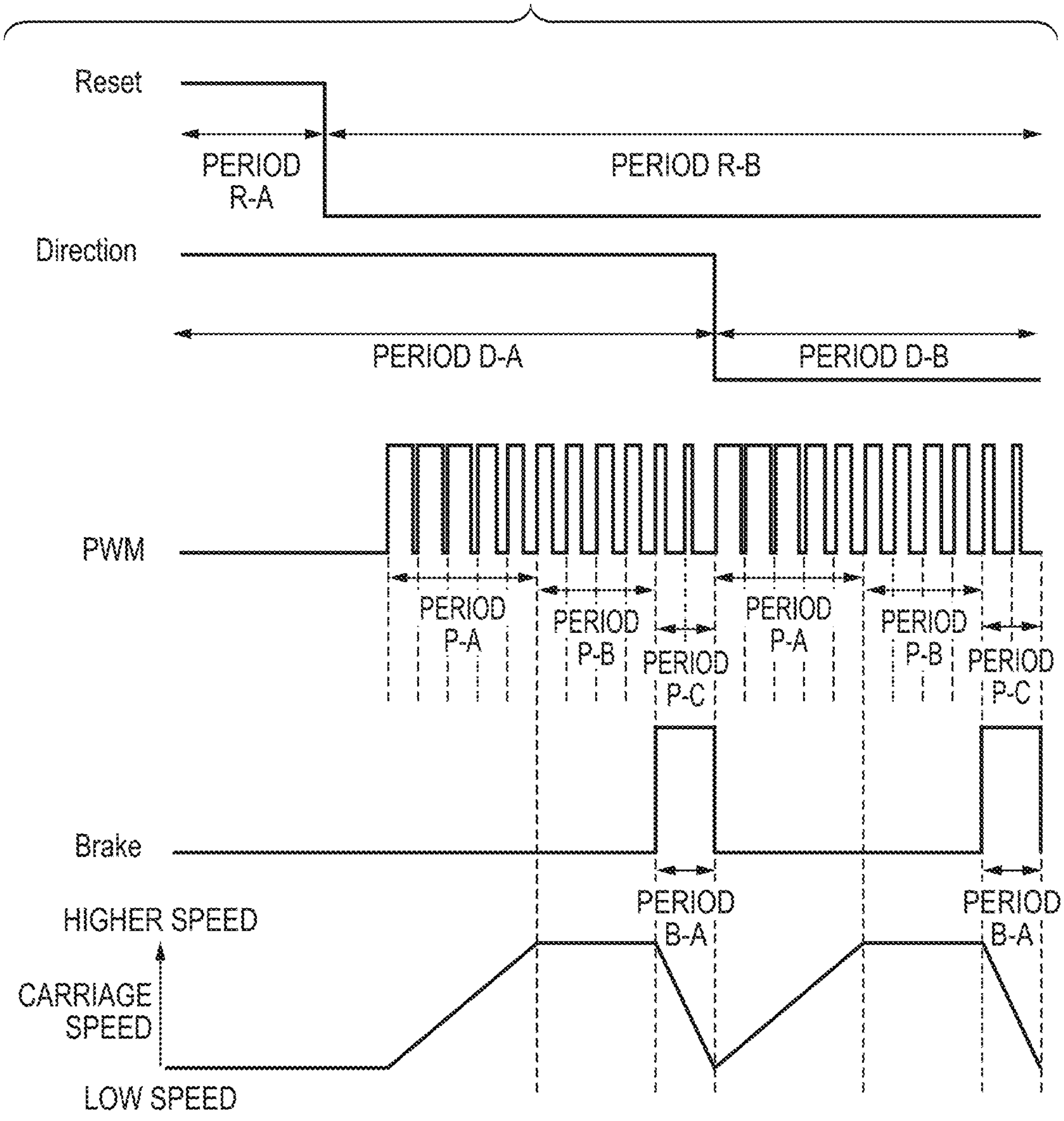
FIG. 4 is a timing chart showing a carriage speed profile and the details of control signals included in a control line 110.

FIG. 4 is a view showing a carriage speed profile and the details of control signals included in the control line 110.

The control line 110 includes, as shown in FIG. 4, a reset signal (Reset), a direction signal (Direction), a PWM signal, and a brake signal (Brake), and the carriage motor 104 and the carriage motor 107 are controlled by the same control signal.

The reset signal controls whether each carriage motor is to be operated. In this embodiment, each carriage motor will not be able to operate when the reset signal is at high level (a period R-A in FIG. 4), and each carriage motor will be able to operate when the reset signal is at low level (a period R-B in FIG. 4).

The direction signal controls the direction of the operation of each carriage motor. In this embodiment, the carriage 3 will move in the forward direction when the direction signal is at high level (a period D-A in FIG. 4), and the carriage 3 will move in the reverse direction when the direction signal is at low level (a period D-B in FIG. 4). Note that an operation in the forward direction and an operation in the reverse direction are, more specifically, operations in the rotation directions of each carriage motor, and the forward direction and the reverse direction have opposite rotation directions from each other. Each carriage motor is formed by a three-phase coil and can change the aforementioned rotation direction by controlling a voltage supplied to each of coil voltage terminals U, V, and W shown in FIG. 6.

The PWM signal controls the amount of energy supplied to each of the coil voltage terminals U, V, and W of each carriage motor. The amount of energy supplied to each coil voltage terminal is determined by an ON/OFF ratio (to be referred to as a PWM duty cycle hereinafter). The coil voltage will increase as the PWM duty cycle increases, thereby causing the carriage motor to rotate at a higher speed. In this embodiment, assume that a predetermined cycle is 10 kHz (each broken line interval shown in FIG. 4). A period in which the PWM duty cycle is greater than 50% is an acceleration period (a period P-A in FIG. 4) of each carriage motor, a period in which the PWM duty cycle is 50% is a constant speed period (a period P-B in FIG. 4), and a period in which the PWM duty cycle is less than 50% is a deceleration period (a period P-C in FIG. 4).

The brake signal is a signal for stopping each carriage motor, and stop control is performed when the brake signal is at high level in this embodiment (a period B-A in FIG. 4). More specifically, the operation of the carriage 3 will be stopped by controlling the voltage applied to each of the coil voltage terminals U, V, and W of each carriage motor so that the movement of the carriage 3 will change to an operation in the reverse direction if the carriage 3 is moving in the forward direction.

The control time and the control waveform of each of the direction signal, the PWM signal, and the brake signal described above are determined based on a signal from the common encoder sensor 14. Here, the signal (encoder signal) from the encoder sensor 14 is generated by a linear scale 13 and the encoder sensor 14 shown in FIG. 2.

Figure 5A:
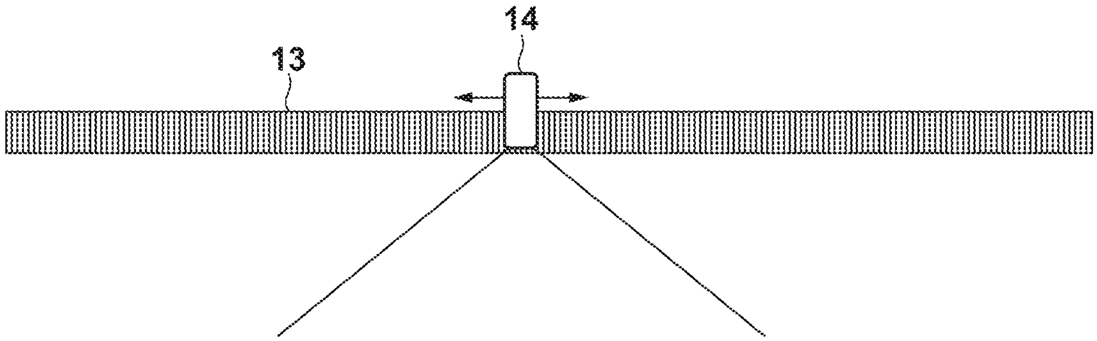
FIGS. 5A to 5C are views for explaining the relationship between a linear scale and an encoder sensor and encoder signals output from the encoder sensor.
Figure 5B:
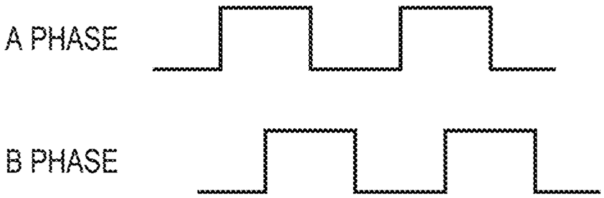
Figure 5C:
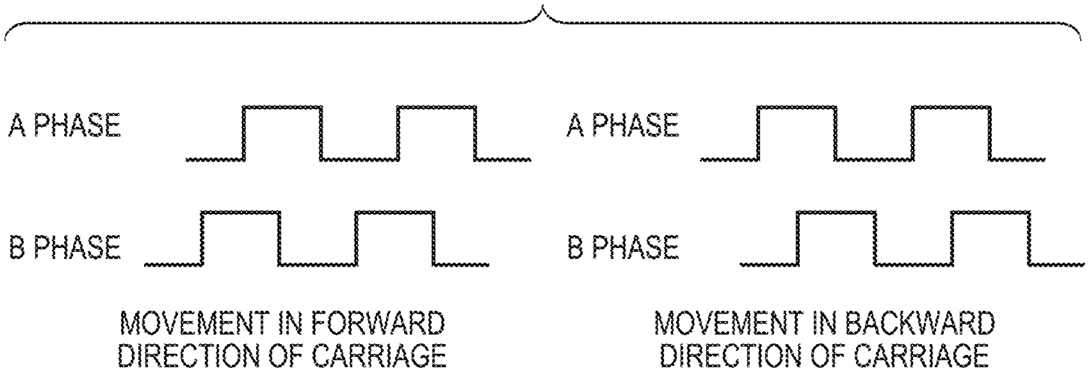

FIGS. 5A to 5C are views for explaining the relationship between the linear scale and the encoder sensor, and the encoder signal output from the encoder sensor.

By causing, as shown in FIG. 5A, the encoder sensor 14 to read the slits formed on the linear scale 13, two encoder signals (an A phase and a B phase) whose phases are shifted from each other by 90° are generated as shown in FIG. 5B. Each signal is input to the CPU 101, and the number of pulses of the signal can be counted to obtain the position of the carriage 3 that has been driven by the carriage motors. In addition, the speed of the carriage 3 can be calculated based on the cycle of each encoder signal. Furthermore, the direction of movement of the carriage 3 can be calculated from the phase state of each encoder signal.

In this embodiment, as shown in FIG. 5C, it will be determined that the carriage is moving in the forward direction if the A-phase signal rises when the B-phase signal is at high level, and it will be determined that the carriage is moving in the reverse direction if the A-phase signal rises when the B-phase signal is at low level.

Figure 6:
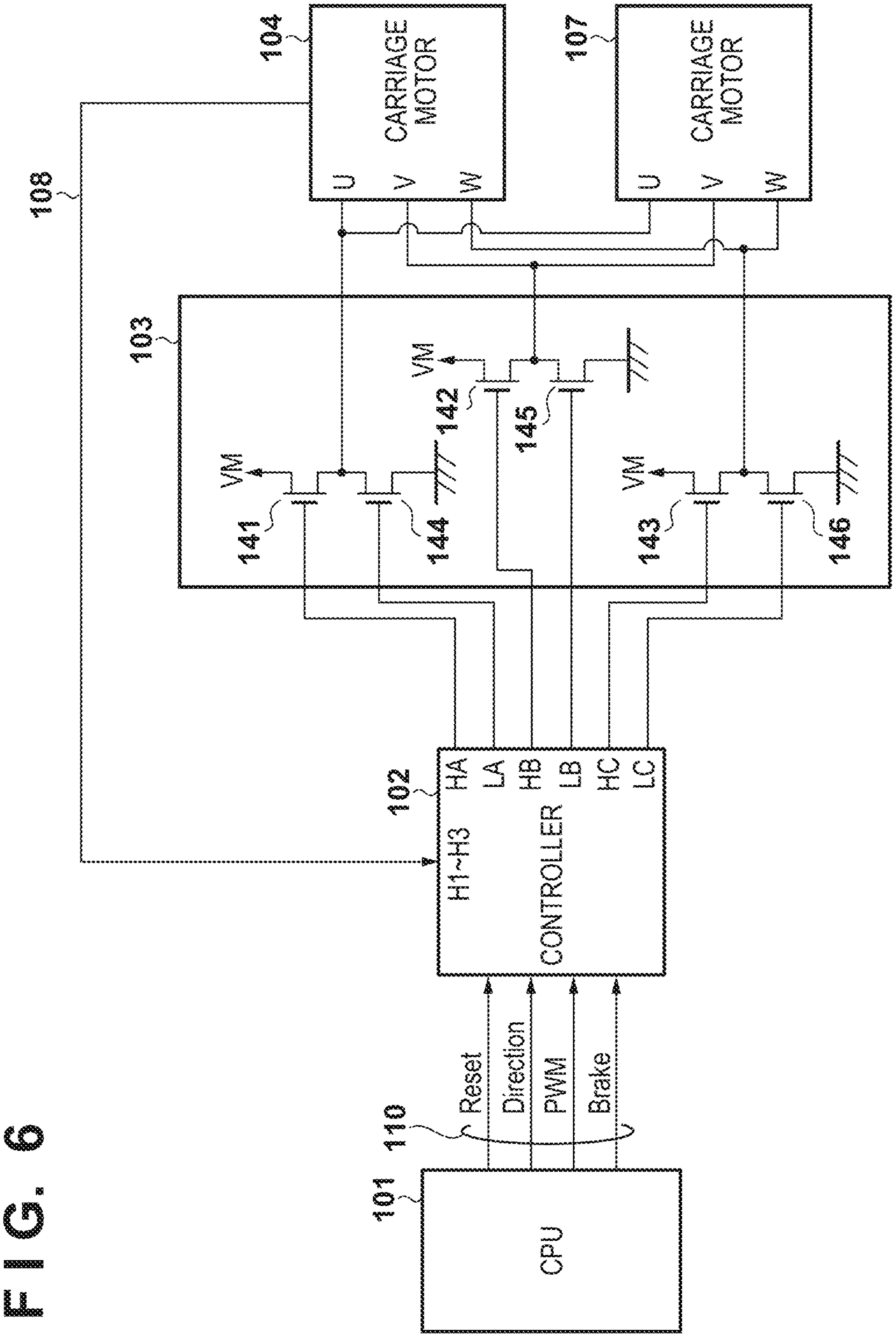
FIG. 6 is a diagram showing more specific details of a relationship between the control line 110, a control unit 102, a driving unit 103, and phase information 108 from a carriage motor 104.

FIG. 6 is a diagram showing more specific details of a relationship between the control line 110, the control unit 102, the driving unit 103, and the phase information 108 from the carriage motor 104.

FIG. 7 is a view showing a truth table of the control signals of the control unit 102.

The driving unit (driver) 103 is formed by, as shown in FIG. 6, power supply lines VM, FETs 141 to 143, and FETs 144 to 146, and is connected to the carriage motor 104 and the carriage motor 107. Also, the phase information 108 is formed by three signals, and the signals are input to terminals H1, H2, and H3 of the control unit (controller) 102.

The phase information 108 indicates the position information of the coil in the carriage motor 104, and a signal of 0 (low voltage) or 1 (high voltage) will be input. Each of terminals HA to HC and terminals LA to LC of the control unit 102 is connected to the gate of the corresponding one of FETs 141 to 146 of the driving unit 103, and the driving of each FET is controlled by a signal of 0 (low voltage) or 1 (high voltage). The outputs from the terminals HA, LA, HB, LB, HC, and LC of the control unit 102 are controlled by the combinations of the phase information 108 and the control signals as shown in FIG. 7. As a result, the FETs 141 to 143 and the FET 144 to FET 146 will be set to ON or OFF and the voltages applied to the coil voltage terminals U, V, and W of each carriage motor will be controlled, thus allowing the carriage to operate at an arbitrary speed and in an arbitrary direction.

The operation of the carriage motors having the arrangement described above with reference to FIGS. 4 to 7 will be described next with reference to a flowchart.

Figure 8:
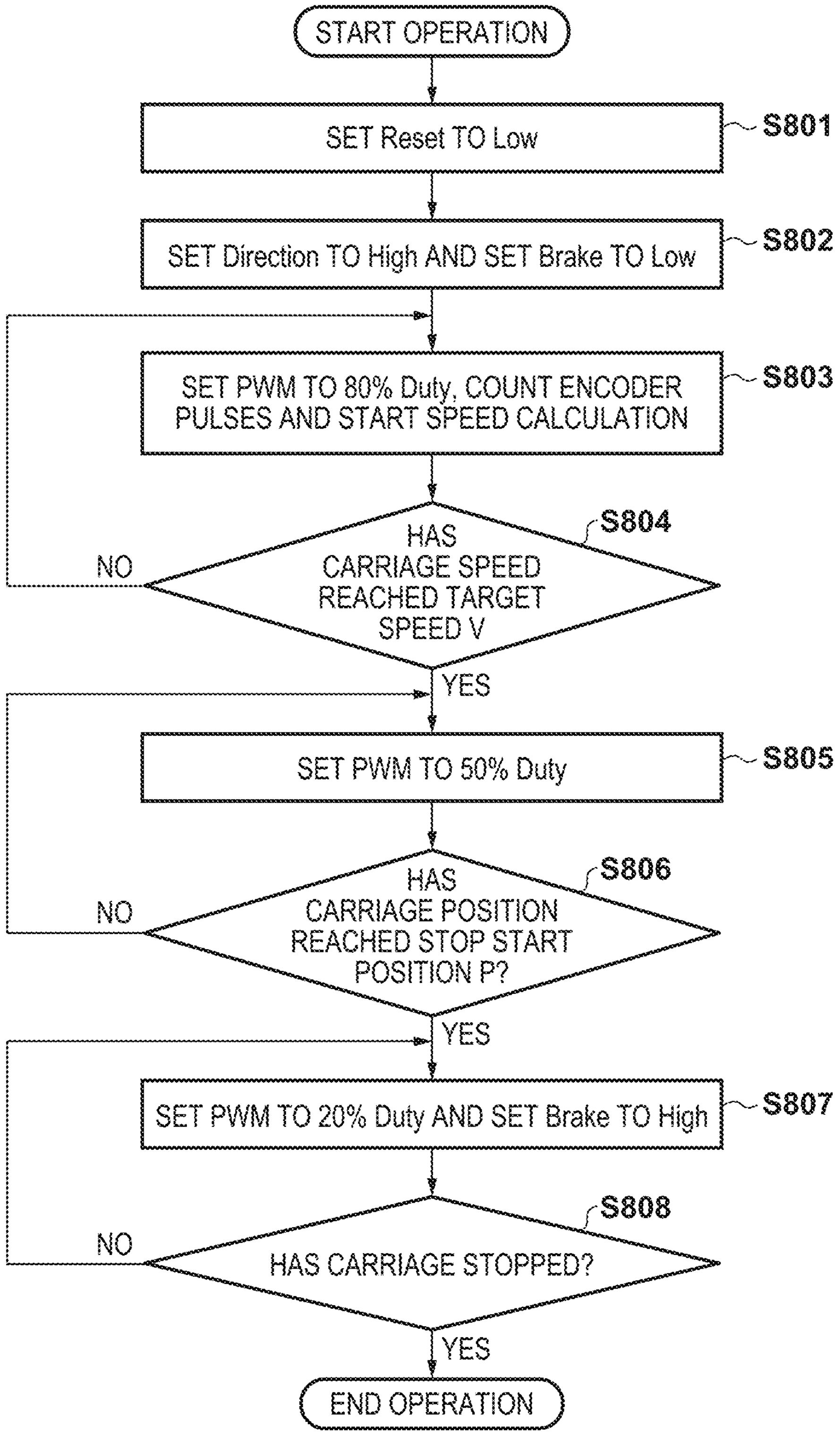
FIG. 8 is a flowchart showing operation control of carriage (CR) motors.

FIG. 8 is a flowchart showing the operation control of carriage (CR) motors. An example in which the two carriage motors 104 and 107 are controlled to move the carriage 3 in the forward direction will be described here. Note that the control for moving the carriage 3 in the reverse direction will also be performed in a similar manner.

When the control to operate the carriage motors in the forward direction is started, the CPU 101 sets, in step S801, the reset signal to low level (the period R-A in FIG. 4). Next, in step S802, the stopped state of the carriage is canceled by setting the direction signal to high level and simultaneously setting the brake signal to low level (the period D-A in FIG. 4).

Next, in step S803, the PWM signal is output at 80% duty cycle, and the carriage 3 starts the operating in the forward direction (the period P-A in FIG. 4). As is obvious from the carriage speed profile of FIG. 4, the carriage 3 is accelerated. The CPU 101 simultaneously counts the number of pulses of each encoder signal, and starts calculating the carriage speed based on the pulse intervals.

In addition, in step S804, the CPU 101 checks whether the carriage speed has reached a target speed V stored in the recovery unit 120. If it is determined that the carriage speed has reached the target speed V, the process will advance to step S805 to change the duty cycle of the PWM signal to 50% to make the carriage 3 move at a constant speed (the period P-B in FIG. 4). As is obvious from the carriage speed profile of FIG. 4, the carriage 3 will shift from moving at an accelerated speed to moving at a constant speed. In contrast, if it is determined that the carriage speed has not reached the target speed V, the process will return to step S803 to continue the carriage control by maintaining the PWM signal at 80% duty cycle.

In step S806, whether the carriage position has reached a stop start position P is checked. Note that the stop start position P is calculated by subtracting a distance to a stop position stored in the ROM 120 from a carriage target stop position Y, which is calculated by the CPU 101 from the carriage speed or the printing width. If it is determined here that the carriage position has not reached the stop start position P, the process will return to step S805 to continue the constant speed movement control executed on the carriage in a state in which the PWM signal is maintained at 50% duty cycle. In contrast, if it is determined that the carriage position has reached the stop start position P, the process will advance to step S807 to stop the operation to move the carriage 3 by setting the duty cycle of the PWM signal to 20% and the brake signal to high level (the period P-C in FIG. 4). As is obvious from the carriage speed profile of FIG. 4, the carriage 3 will shift from moving at an accelerated speed to moving at a decelerated speed.

In step S808, whether the carriage 3 has stopped is checked. If it is confirmed, based on the output of the encoder signals, that the position of the carriage 3 has not changed, that is, the carriage has stopped, the control for moving the carriage in the forward direction will end. In contrast, if it is determined that the carriage 3 has not stopped, the process will return to step S807 to continue the control to decelerate the carriage.

Note that the value of the duty setting of the PWM signal is not particularly limited since the duty setting will change based on the target carriage speed, the acceleration speed during the time of acceleration/deceleration, or the like. In addition, the procedure of the operation to be performed for a movement in the reverse direction is also similar to that of the operation performed for the movement in the forward direction.

Hence, according to the embodiment described above, by arranging a common control line, a common control unit, and a common driving unit, it will be possible to reduce the circuit area and to simplify the control method. As a result, good control responsiveness and good control stability can be obtained even in an arrangement using one set of (two) carriage motors to drive a heavyweight carriage, and it will be possible to implement a high-speed and high-accuracy carriage driving operation.

Note the carriage motor is not limited to a brushless DC motor and may be, other than a DC motor such as a brushless DC motor, a stepping motor or the like. The form (type) of the carriage motors is not limited as long as motors that can drive a carriage and motors having similar kinds of driving characteristics are used for both left and right ends.

In addition, although an arrangement in which the control unit 102 controls the common driving unit 103 by using the signals of the control line 110 and the phase information 108 from the carriage motor 104 has been described, it may be arranged so that the control will be performed based on the phase information from the carriage motor 107.

In addition, as long as identical signals are output to the control line 110, it may be arranged so that the signals will be output from the same terminal or from separate terminals from the CPU 101.

Furthermore, although the embodiment described above has an arrangement in which driving control can be performed easily by arranging so that the plurality of carriage motors 104 and 107 each having a driving pulley 19 will have similar characteristics, the present invention is not limited to this. For example, the left and right driving pulleys 19 may have different diameters from each other or the outputs from the carriage motor 104 and the carriage motor 107 may differ even if the driving characteristics of these motors are similar.

Although a single controller and a single motor driver were used in the motor control arrangement of the printing apparatus according to the first embodiment shown in FIG. 3, an arrangement that uses motor drivers corresponding to two carriage motors may also be employed. Furthermore, an arrangement using two controllers may also be employed. Two modifications which are an arrangement that uses a single control unit (controller) and two driving units (motor drivers) and an arrangement that uses two control units (controllers) and two driving units (motor drivers) will be described hereinafter.

<Modification 1>

Figure 9:
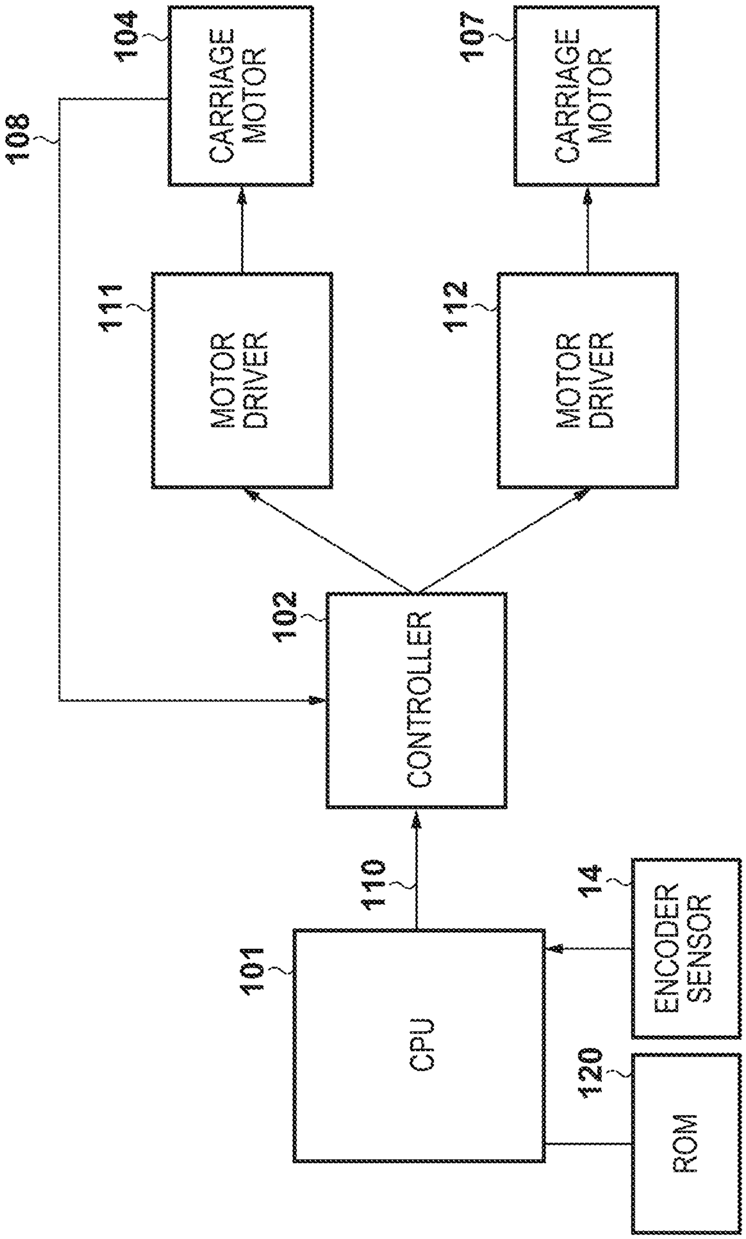
FIG. 9 is a block diagram showing the motor control arrangement of a printing apparatus according to Modification 1 of the first embodiment.

FIG. 9 is a block diagram showing the motor control arrangement of a printing apparatus according to Modification 1 of the first embodiment. Note that in FIG. 9, the same reference numerals denote components similar to those already described with reference to FIG. 3, and a description thereof will be omitted.

According to FIG. 9, the control unit 102 controls, based on the signals of the control line 110 and the phase information 108 from the carriage motor 104, a driving unit (motor driver) 111 and a driving unit (motor driver) 112. Next, the carriage motor 104 and the carriage motor 107 perform predetermined operations based on driving signals generated based on the ON/OFF states of the FETs of the driving unit 111 and those of the driving unit 112.

Figure 10:
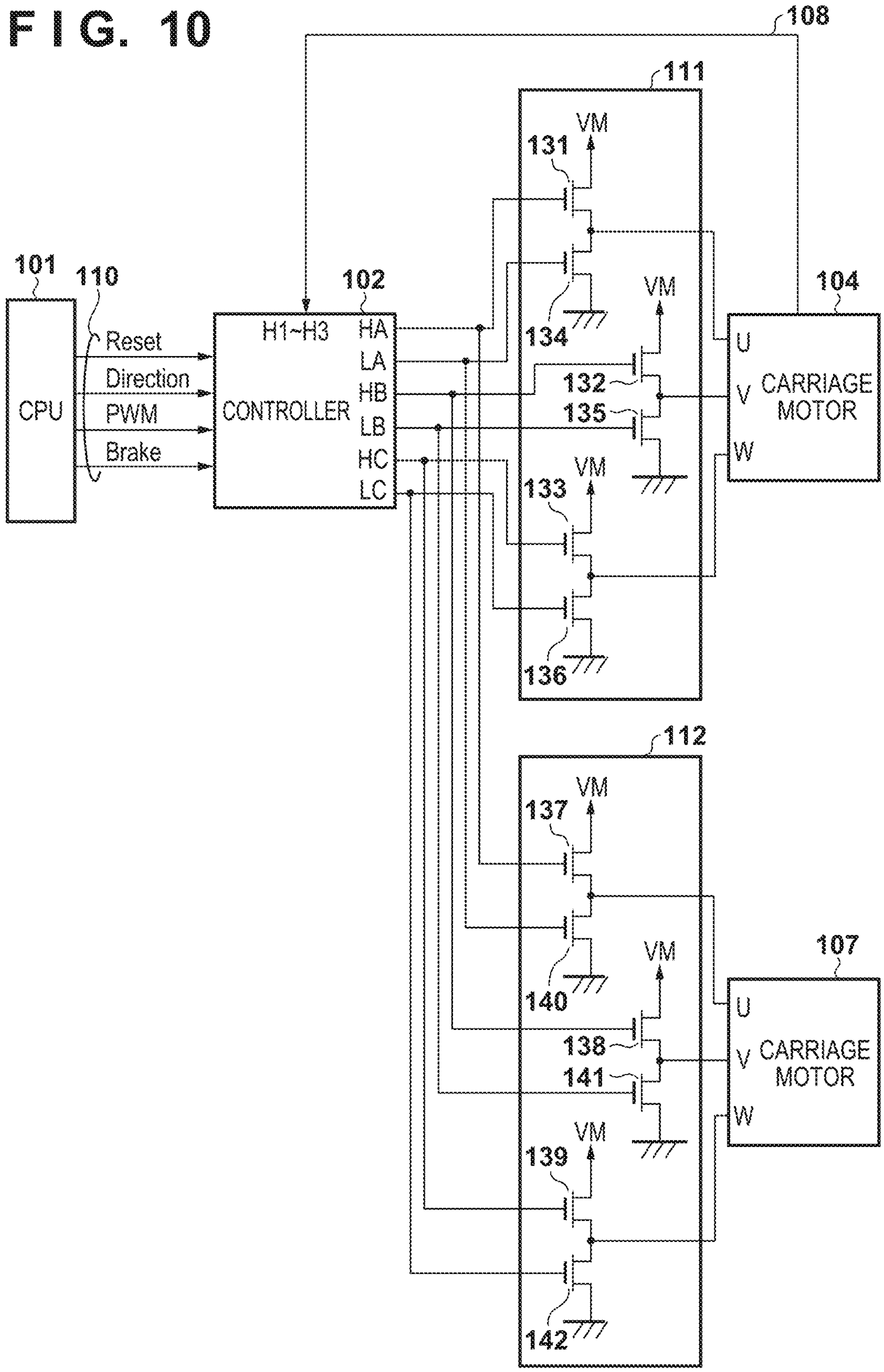
FIG. 10 is a diagram showing more specific details of a relationship between the control line 110, the control unit 102, a driving unit 111, a driving unit 112, and the phase information 108 from the carriage motor 104.

FIG. 10 is a diagram showing more specific details of the relationship between the control line 110, the control unit 102, the driving unit 111, the driving unit 112, and the phase information 108 from the carriage motor 104. Note that in FIG. 10, the same reference numerals denote components similar to those already described with reference to FIG. 6, and a description thereof will be omitted.

Although the control method of the carriage motor of this modification is similar to that of the first embodiment, the driving unit 111 is connected to the carriage motor 104 and formed by the power supply lines VM, FETs 131 to 133, and FETs 134 to 136. The driving unit 112 is connected to the carriage motor 107 and formed by the power supply lines VM, FETs 137 to 139, and FETs 140 to 142. The two driving units have the same circuit arrangement in this manner.

As shown in FIG. 10, in the arrangement of this modification, the control line 110 and the control unit 102 are arranged in common for the driving control of the two carriage motors, and each of two driving units is connected to a corresponding one of the carriage motors.

By employing such an arrangement, the electric power load on each driving unit can be reduced by half, thereby allowing reduction of costs necessary for measures against heat.

<Modification 2>

Figure 11:
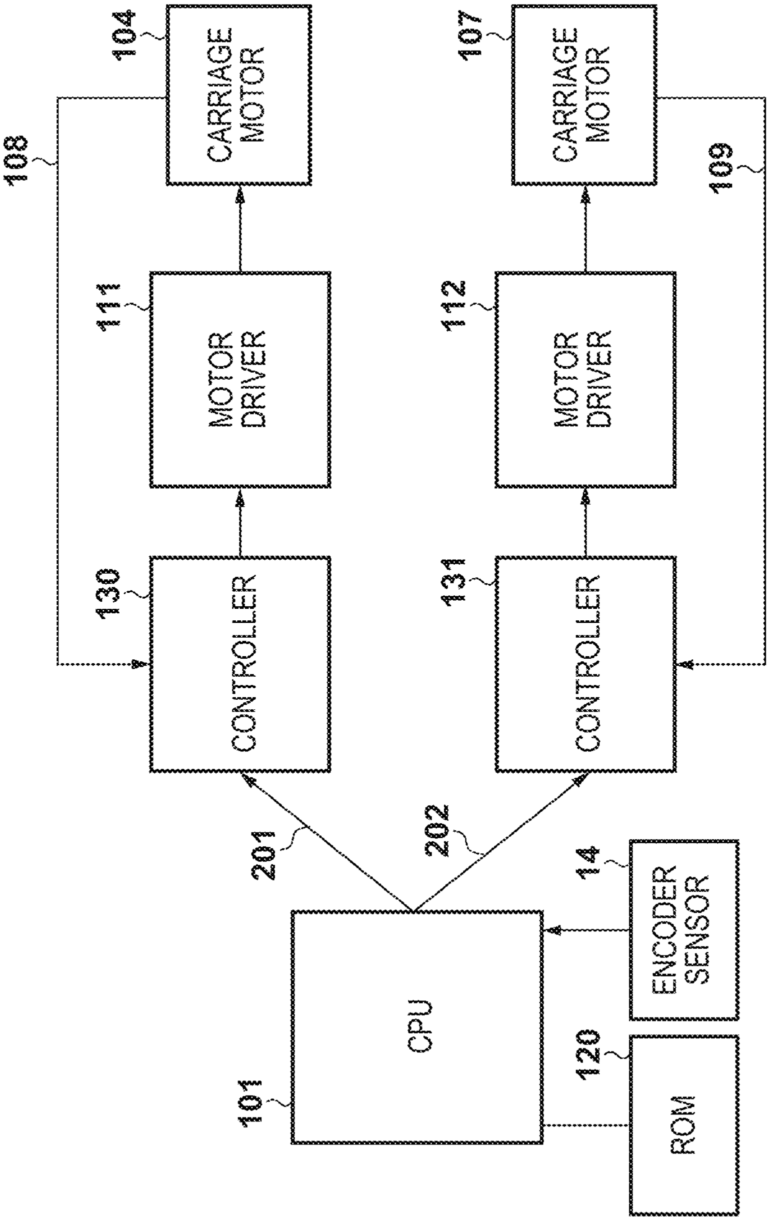
FIG. 11 is a block diagram showing the motor control arrangement of a printing apparatus according to Modification 2 of the first embodiment.

FIG. 11 is a block diagram showing the motor control arrangement of a printing apparatus according to Modification 2 of the first embodiment. Note that in FIG. 11, the same reference numerals denote components similar to those already described with reference FIGS. 3 and 9, and a description thereof will be omitted.

According to FIG. 11, the CPU 101 controls a control unit (controller) 130 and a control unit (controller) 131 by a control line 201 and a control line 202, respectively. Note that in this modification, the control lines 201 and 202 include identical signals. The control unit 130 and the control unit 131 control the driving unit 111 and the driving unit 112, respectively, based on signals from the control line 201 and the control line 202, the phase information 108 from the carriage motor 104 and phase information 109 from the carriage motor 107. Subsequently, the carriage motor 104 and the carriage motor 107 perform predetermined operations based on driving signals generated based on the ON/OFF states of the FETs of the driving unit 111 and those of the driving unit 112.

Figure 12:
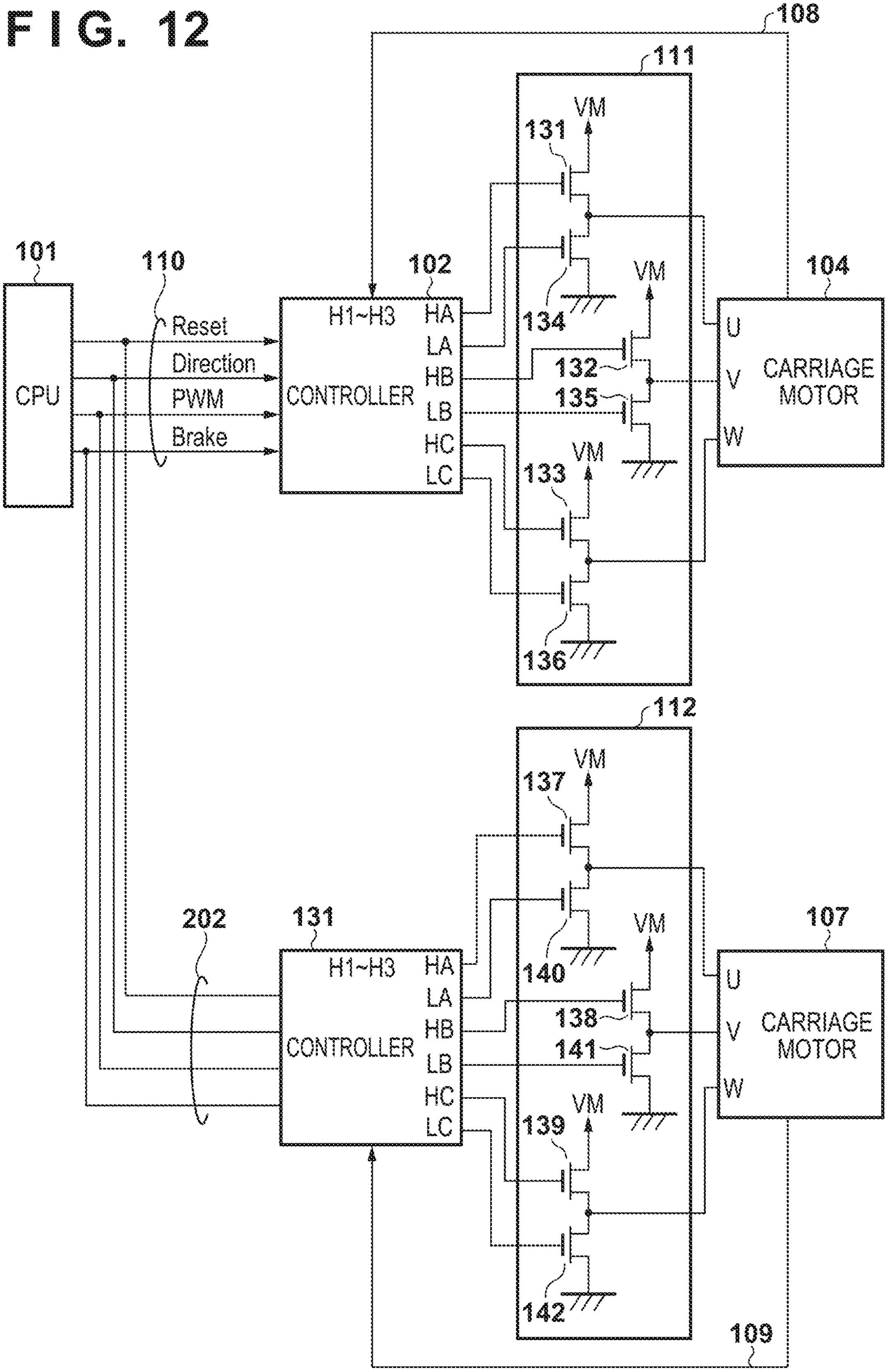
FIG. 12 is a diagram showing more specific details of a relationship between a control line 201, a control line 202, a control unit 130, a control unit 131, the driving unit 111, the driving unit 112, the phase information 108 from the carriage motor 104, and the phase information 109 from a carriage motor 109.

FIG. 12 is a diagram showing in more specific details of the relationship between the control line 201, the control line 202, the control unit 130, the control unit 131, the driving unit 111, the driving unit 112, the phase information 108 from the carriage motor 104, and the phase information 109 from the carriage motor 107. Note that in FIG. 12, the same reference numerals denote components similar to those already described with reference to FIGS. 6 and 10, and a description thereof will be omitted.

The control method of the carriage motors of this modification is similar to that of the first embodiment, and the arrangements of the two drivers are similar to those of Modification 1. As shown in FIG. 12, in the arrangement of this modification, the control line 201 and the control line 202 are arranged in common, and each carriage motor is connected to a corresponding control unit and a corresponding driving unit. In addition, the two controllers have the same arrangement.

By employing such an arrangement, the electric power load on each driving unit can be reduced by half, thereby allowing reduction of costs necessary for measures against heat. In addition, in this modification, since control will be performed by inputting each of the pieces of phase information 108 and the phase information 109 of the respective carriage motors to the corresponding one of the control units, each carriage motor can be controlled more accurately.

Furthermore, by employing such an arrangement, it will be possible to make, while using a signal from the same encoder sensor 14, an arbitrary carriage motor operate by arranging a control line for each carriage motor. As a result, for example, it will be possible execute control to change the power ratio (for example, 60:40 or the like) between the carriage motor 104 and the carriage motor 107, thereby allowing a more precise motor control operation to be implemented.

Second Embodiment

Two carriage motors were simultaneously driven in the first embodiment. However, in practice, in a case in which the carriage will not execute a high-speed movement, for example, when executing printing up to a speed of 70 ips or when performing an operation other than printing, the carriage can also be operated by driving one carriage motor while making the other carriage motor follow. Hence, in such aforementioned driving operation, it is impossible to discriminate whether each carriage motor is operating normally.

Therefore, this embodiment will describe an example in which the carriage motors will be driven one by one at separate timings to confirm whether each carriage motor is operating normally.

Figure 13:
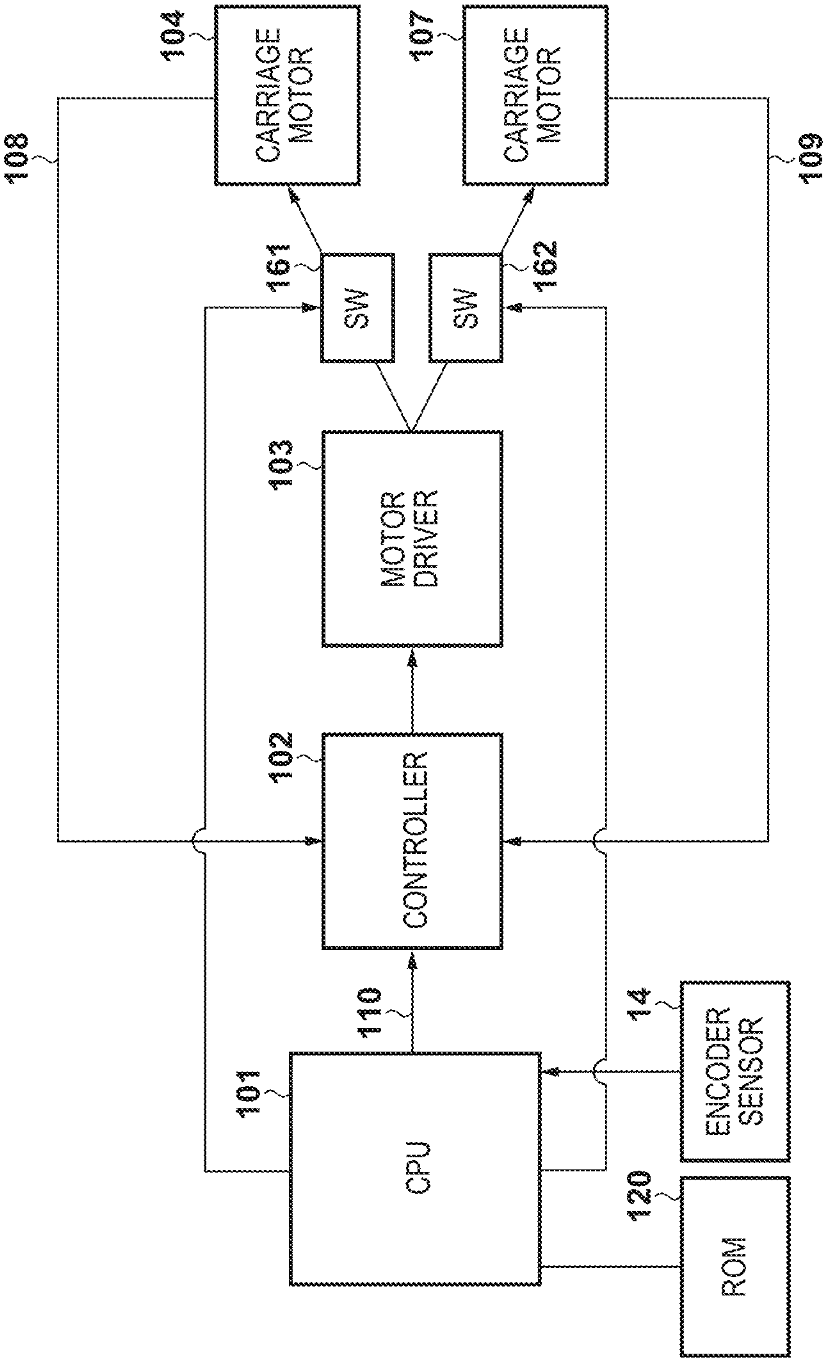
FIG. 13 is a block diagram showing the motor control arrangement of a printing apparatus according to the second embodiment.

FIG. 13 is a block diagram showing the motor control arrangement of a printing apparatus according to the second embodiment. Note that in FIG. 13, the same reference numerals denote the same components similar to those already described with reference to FIG. 3, and a description thereof will be omitted.

As is obvious from comparing FIGS. 13 and 3, the basic arrangement is similar to the arrangement according to the first embodiment shown in FIG. 3. However, in this case, a switch (SW) 161 and a switch (SW) 162 are arranged on a control line between two carriage motors and a driving unit 103. A CPU 101 will perform ON/OFF control on each of the switch 161 and the switch 162 via corresponding individual control lines.

Processing for using such an arrangement to confirm whether each of carriage motors 104 and 107 is operating normally will be described next. A sequence for confirming the operation of each carriage motor is incorporated in an initialization operation performed when the printing apparatus is powered on. The initialization processing is an operation for confirming whether components inside the printing apparatus are normal.

Figure 14:
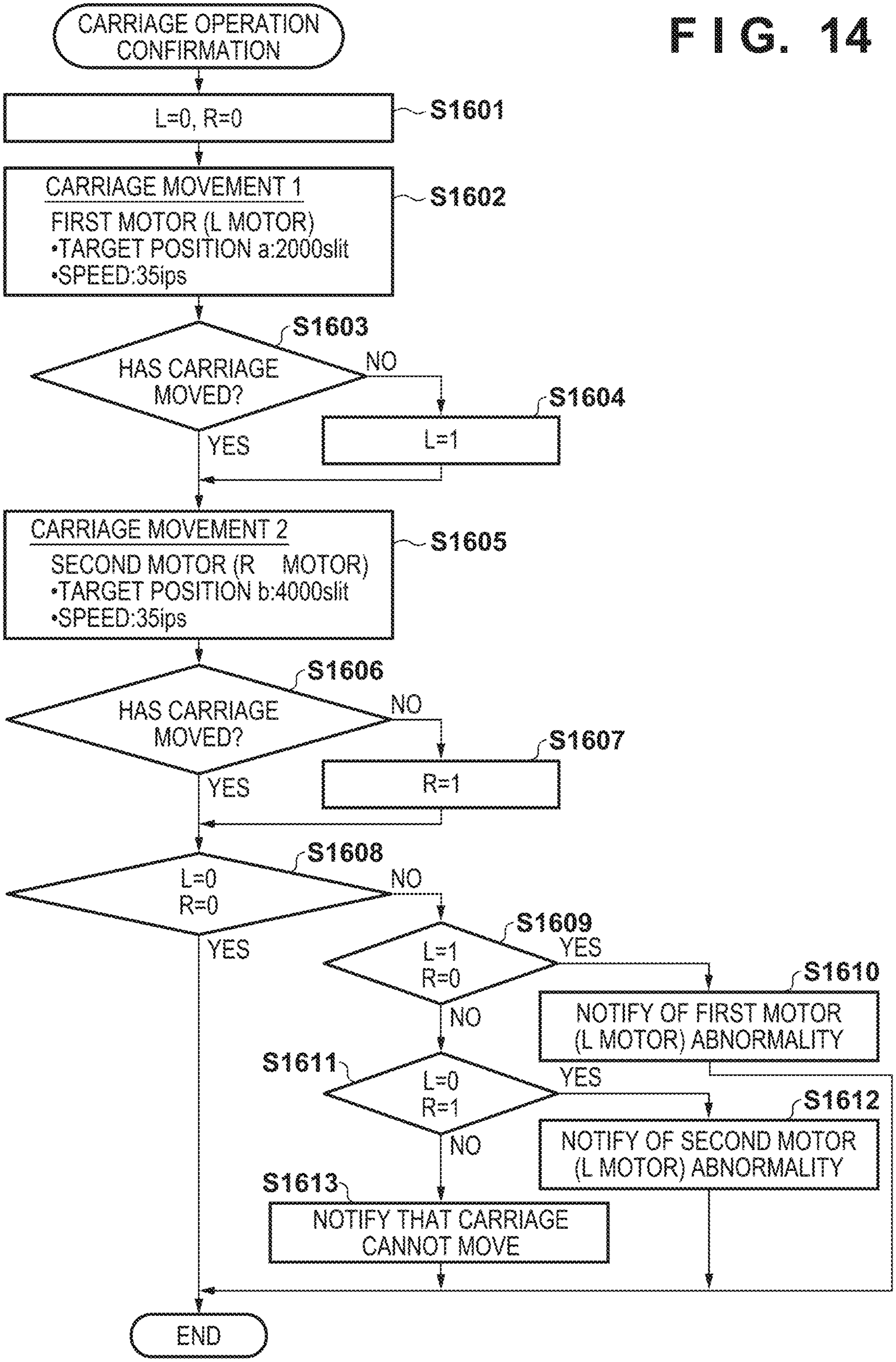
FIG. 14 is a flowchart showing a carriage motor confirmation sequence.

FIG. 14 is a flowchart showing a carriage motor confirmation sequence.

By executing this sequence, the carriage motors will be operated individually to confirm whether each carriage motor is not operating abnormally. A detailed description will be given hereinafter with reference to FIG. 2 which shows target positions a, b, and c of a carriage in this sequence.

First, in step S1601, parameters L and R which indicate whether the two carriage motors are normal or abnormal are reset to L=0 and R=0. Next, in step S1602, in a state in which a carriage 3 is at its movement origin point (a home position or an initial position) which is indicated as "0" in FIG. 2, only the carriage motor 104 is driven. More specifically, an operation command in which "a" indicated in FIG. 2 is set as a target position and the carriage speed is set to 35 ips is issued and only the switch 161 is set to ON to make the carriage 3 operate in the forward direction. Note that in this embodiment, the resolution of the slits formed on a linear scale 13 is 1,200 dpi, and the target position a corresponds to a point at 2,000 slits (=42.3 mm) from the origin point 0 when measured by the number of slits provided on the linear scale.

Next, in step S1603, whether the carriage 3 was able to move is confirmed. Although this is confirmed by determining whether the carriage 3 was able to move 1,000 (=21.2 mm) slits or more within 5 sec of the start of the driving operation of the motor, the present invention is not limited to this. For example, it may be confirmed by checking whether an encoder signal was detected at an expected time at the target position a. If it is determined here that the carriage 3 was not able to move, the process will advance to step S1604 to set L=1, and the process will subsequently advance to step S1605. In contrast, if it is determined that the carriage 3 was able to move, the parameter L will remain at L=0, and the process will advance to step S1605.

Next, in the process of step S1605, only the carriage motor 107 is driven. More specifically, an operation command in which "b" indicated in FIG. 2 is set as a target position and the carriage speed is set to 35 ips is issued, and only the switch 162 is set to ON to make the carriage 3 operate in the forward direction. Note that the target position b corresponds to a point at 4,000 slits (=84.7 mm) from the origin point 0 when measured by the number of slits provided on the linear scale.

Subsequently, in step S1606, whether the carriage 3 was able to move is confirmed. This is confirmed by determining whether the carriage 3 was able to move 1,000 (=21.2 mm) slits or more within 5 sec of the start of the driving operation of the motor, the present invention is not limited to this. For example, it may be confirmed by checking whether an encoder signal was detected at an expected time at the target position b. If it is determined here that the carriage 3 was not able to move, the process will advance to step S1607 to set R=1, and the process will subsequently advance to step S1608. In contrast, if it is determined that the carriage 3 was able to move, the parameter R will remain at R=0, and the process will advance to step S1608.

Next, in the process of step S1608, whether the values of the two parameters are L=0 and R=0 is checked. If the two parameters are L=0 and R=0, it will be determined that both the two carriage motors 104 and 107 are operating normally, and the confirmation sequence will end. In contrast, if the two parameters are not L=0 and R=0, the process will advance to step S1609 to check whether the values of the two parameters are L=1 and R=0.

If the two parameters are L=1 and R=0, the process will advance to step S1610 to determine that the carriage motor 104 is abnormal, and the user will be notified of this abnormality. The notification will be performed by displaying a message on an operation panel (not shown) of a printing apparatus 100, by transmitting error information to a host apparatus (not shown) connected to the printing apparatus 100 to display an error message on a display of the host apparatus, or the like. For example, a failure in a wiring line to the carriage motor 104, a failure of the carriage motor 104 itself, or the like can be considered to be a cause of the abnormality in this case.

In contrast, if the two parameters are not L=1 and R=0, the process will advance to step S1611 to check whether the values of the two parameters are L=0 and R=1. If the two parameters are L=0 and R=1, the process will advance to step S1612 to determine that the carriage motor 107 is abnormal, and the user will be notified of this abnormality. This notification is performed in a manner similar to the notification method performed in step S1610. For example, a failure in a wiring line to the carriage motor 107, a failure of the carriage motor 107 itself, or the like can be considered to be a cause of the abnormality in this case.

In contrast, if the two parameters are not L=0 and R=1 (that is, the two parameters are L=1 and R=1), the process will advance to step S1613 to determine that the carriage 3 cannot move because an obstacle or the like is present in the periphery of the carriage 3, and the user will be notified of this determination. This notification is performed in a manner similar to the notification method performed in step S1610.

The confirmation sequence will also be ended after step S1610, step S1612, or the notification in step S1613.

Note that after step S1610, step S1612, or the notification in step S1613, the user may turn off the printing apparatus 100 and turn on the printing apparatus 100 again to cause the initialization operation to be executed again. If the abnormality of the carriage motor 104 is unsolved even after this operation, the periphery of the carriage motor 104 will be checked or components will be replaced. On the other hand, if the abnormality of the carriage motor 107 is unsolved even after this operation, the periphery of the carriage motor 107 will be checked or components will be replaced. In a case in which the state in which the carriage cannot move is unsolved, the periphery of the carriage 3 will be checked or components of the carriage unit will be replaced.

Note that in this embodiment, the operation commands to the carriage motors 104 and 107 and the comparison of the slit detection result of the linear scale 13 are performed to confirm, by issuing a motor operation command, whether the detection by an encoder sensor 14 has changed and the carriage 3 can move a predetermined amount or more. In this case, while operating the carriage 3 in the forward direction, it will be possible to make a determination in a continuous operation without stopping the carriage 3 for each determination.

Furthermore, the target positions of the carriage and the carriage speed described above are merely examples, and other target positions and another carriage speed may also be used.

According to the above-described confirmation sequence, in a printing apparatus that uses a plurality of carriage motors to operate a carriage, whether each of the plurality of carriage motors is operating normally can be reliably detected without making the carriage operate at a high speed.

<Modification 1>

Another example of confirming whether the individual carriage motors 104 and 107 are operating normally will be described here. In this example, whether each carriage motor is abnormal is confirmed after confirming that an obstacle is absent in the present in the periphery of the carriage 3 and operating each carriage motor after using both carriage motors to operate the carriage 3. Note that in this modification, it will be assumed that the arrangement shown in FIG. 13 is used as the motor control arrangement of the printing apparatus.

Figure 15:
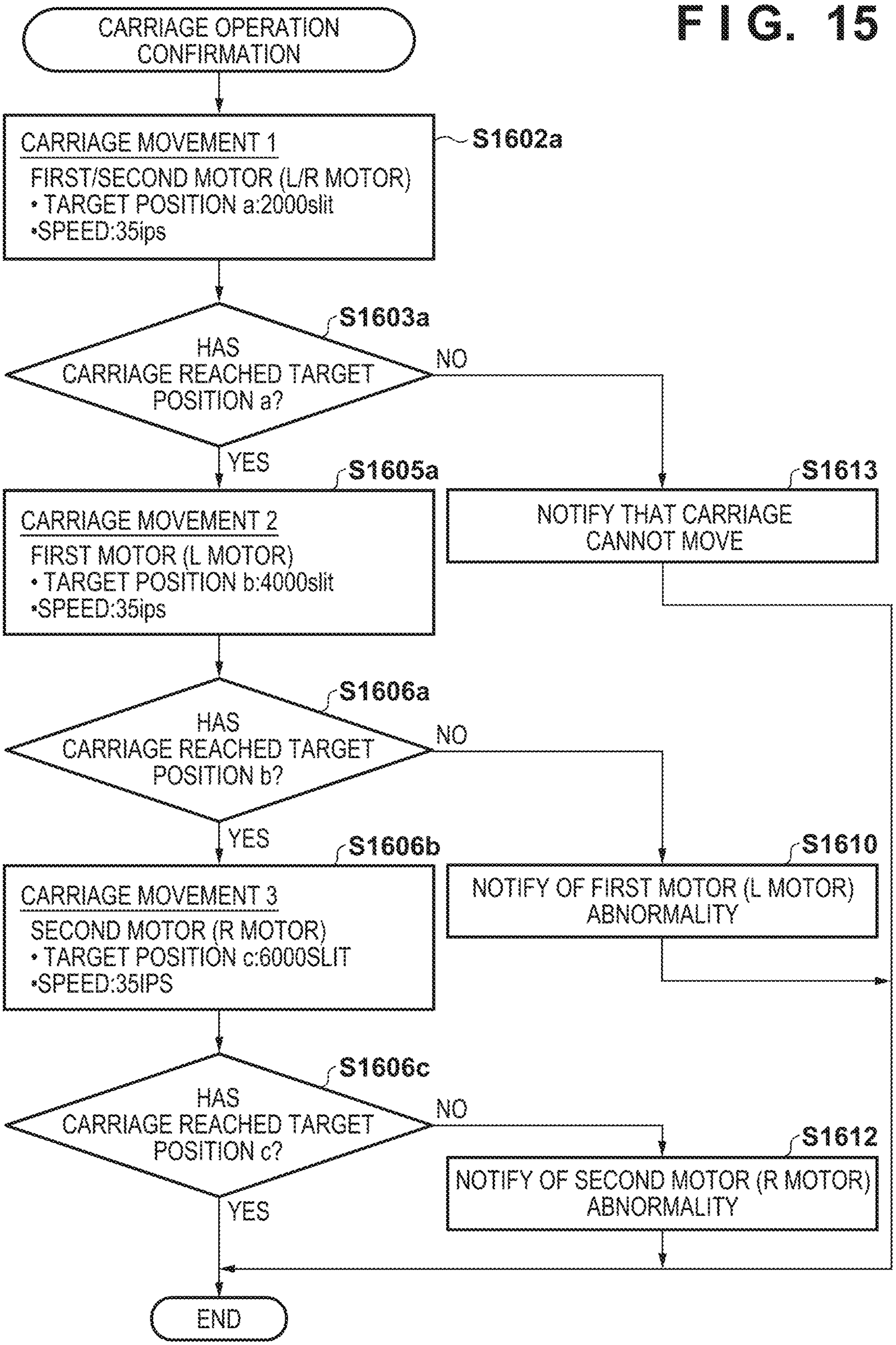
FIG. 15 is a flowchart showing a carriage motor confirmation sequence according to Modification 1 of the second embodiment.

FIG. 15 is a flowchart showing the carriage motor confirmation sequence according to Modification 1 of the second embodiment. A detailed description will be given hereinafter with reference to FIG. 2 which shows the target positions a, b, and c of the carriage in this sequence. Note that in FIG. 15, the same step numbers are used to denote the same processing steps as those already described with reference to FIG. 13, and a description thereof will be omitted.

According to FIG. 15, in step S1602a, both the carriage motors 104 and 107 are driven in a state in which the carriage 3 is at its movement origin point (the home position or the initial position) which is indicated as "0" in FIG. 2. More specifically, an operation command in which "a" indicated in FIG. 2 is set as a target position and the carriage speed is set to 35 ips is issued, and both of the switches 161 and 162 are set to ON to make the carriage 3 operate in the forward direction. Note that in this example, the resolution of the slits formed on a linear scale 13 is 1,200 dpi, and the target position a corresponds to a point at 2,000 slits (=42.3 mm) from the origin point 0 when measured by the number of slits provided on the linear scale.

Next, in step S1603a, whether the carriage 3 has reached the target position a is confirmed. This is confirmed by determining whether the carriage 3 is within ±30 slits (=±0.625 mm) of the target position within 5 sec. However, the present invention is not limited to this. For example, this may be confirmed by checking whether an encoder signal is detected at an expected time T±Δt at the target position a. If it is determined here that the carriage 3 has not reached the target position a, it will be determined that the carriage 3 is unable to move because an obstacle is present in the periphery of the carriage 3, the process will advance to step S1613, and the processing will subsequently end. In contrast, if it is determined that the carriage 3 has reached the target position a, the process will advance to step S1605a.

In step S1605a, only the carriage motor 104 is driven. More specifically, an operation command in which "b" indicated in FIG. 2 is set as a target position and the carriage speed is set to 35 ips is issued, and only the switch 161 is set to ON to make the carriage 3 operate in the forward direction. The target position b corresponds to a point at 4,000 slits (=84.7 mm) from the origin point 0 when measured by the number of slits provided on the linear scale. Subsequently, in step S1606a, whether the carriage 3 has reached the next target position b is confirmed. This is confirmed by determining whether the carriage 3 is within +30 slits (=+0.625 mm) of the target position within 5 sec. However, the present invention is not limited to this. For example, this may be confirmed by checking whether an encoder signal is detected at the expected time T±Δt at the target position b. If it is determined here that the carriage 3 has not reached the target position b, the process will advance to step S1610, and the processing will subsequently end. In contrast, if it is determined that the carriage 3 has reached the target position b, the process will advance to step S1606b.

In step S1606b, only the carriage motor 107 is driven. More specifically, an operation command in which "c" indicated in FIG. 2 is set as a target position and the carriage speed is set to 35 ips is issued, and only the switch 162 is set to ON to make the carriage 3 operate in the forward direction. The target position c corresponds to a point at 6,000 slits (=127 mm) from the origin point 0 when measured by the number of slits provided on the linear scale. Subsequently, in step S1606c, whether the carriage 3 has reached the next target position c is confirmed. This is confirmed by determining whether the carriage 3 is within +30 slits (=+0.625 mm) of the target position within 5 sec. However, the present invention is not limited to this. For example, this may be confirmed by checking whether an encoder signal is detected at the expected time T±Δt at the target position c.

If it is determined here that the carriage 3 has not reached the target position c, the process will advance to step S1612, and the processing will subsequently end. In contrast, if it is determined that the carriage 3 has reached the target position c, the processing will be end because it has been confirmed that the carriage motors 104 and 107 are operating normally.

Therefore, according to the embodiments and the modifications described above, even in a printing apparatus that uses a plurality of carriage motors to operate a carriage, whether each of the plurality of carriage motors is operating normally can be reliably detected without making the carriage operate at a high speed.

Note that although this modification employed a confirmation method in which the carriage 3 is operated repeatedly in the forward direction, a method in which the carriage 3 is operated and stopped in the reverse direction after the carriage 3 has been operated and stopped in the forward direction may also be employed.

<Modification 2>

Figure 16:
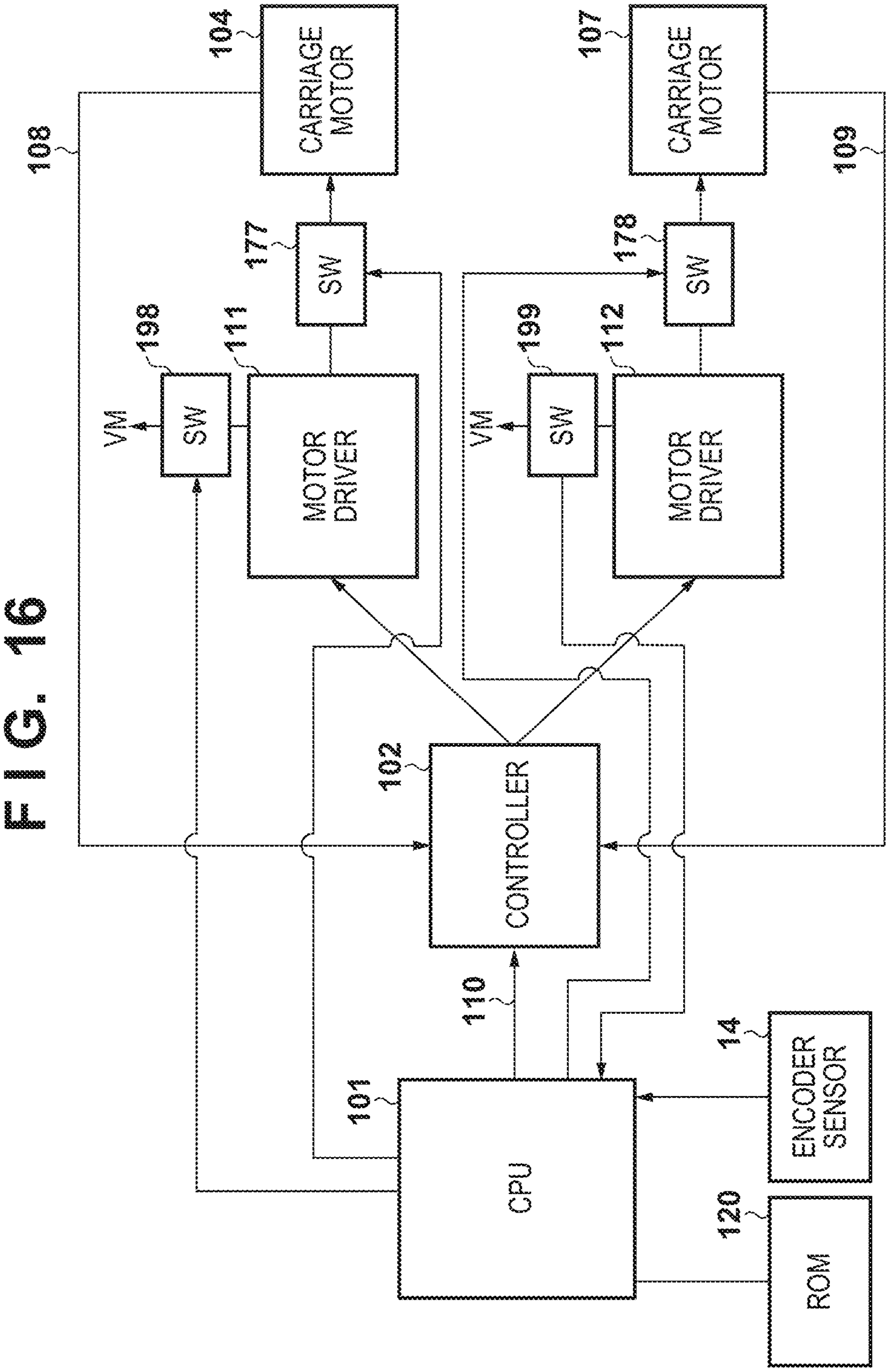
FIG. 16 is a block diagram showing the motor control arrangement of a printing apparatus according to Modification 2 of the second embodiment.

FIG. 16 is a block diagram showing the motor control arrangement of a printing apparatus according to Modification 2 of the second embodiment. As is obvious from comparing FIGS. 16 and 9, this control arrangement is an arrangement in which switches and control lines have been added to the motor control arrangement of the printing apparatus according to Modification 1 of the first embodiment shown in FIG. 9.

Note that in FIG. 16, the same reference numerals denote components similar to those already described with reference to FIGS. 3 and 9, and a description thereof will be omitted. Even by employing this kind of arrangement, it will be possible to drive only one of the two carriage motors 104 and 107.

As shown in FIG. 16, switches (SWs) 177 and 178 are arranged on the control lines from driving units 111 and 112 corresponding to the two carriage motors, respectively. The CPU 101 can individually execute ON/OFF control on each of the switches 177 and 178.

Furthermore, it may be arranged so that the CPU 101 will control the driving units 111 and 112 individually by arranging switches (SWs) 198 and 199 on power supply lines VM of the driving units 111 and 112 corresponding to the two carriage motors, respectively. In this manner, it is possible to freely implement the motor control arrangement depending on the layout of a pattern, the number of switches, and the like.

By using the motor control arrangement described above, it will be possible to execute a sequence for confirming individual carriage motors as described with reference to FIGS. 14 and 15.

<Modification 3>

Figure 17:
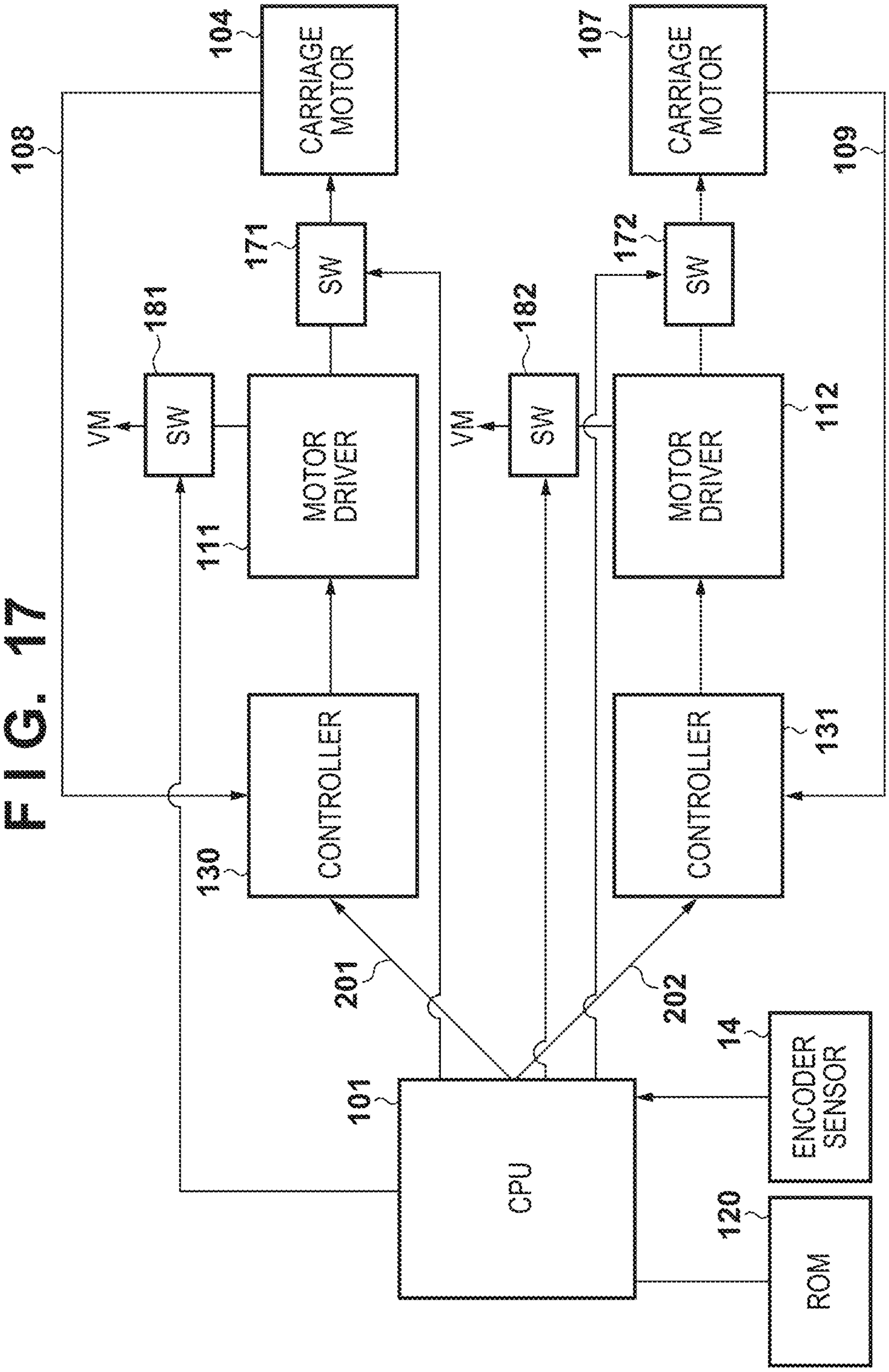
FIG. 17 is a block diagram showing the motor control arrangement of a printing apparatus according to Modification 3 of the second embodiment.

FIG. 17 is a block diagram showing the motor control arrangement of a printing apparatus according to Modification 3 of the second embodiment. As is obvious from comparing FIGS. 17 and 11, this control arrangement is an arrangement in which switches and control lines have been added to the motor control arrangement of the printing apparatus according to Modification 2 of the first embodiment shown in FIG. 1.

Note that in FIG. 17, the same reference numerals denote components similar to those already described with reference to FIGS. 3 and 11, and a description thereof will be omitted. Even by employing this kind of arrangement, it will be possible to drive only one of the two carriage motors 104 and 107.

As shown in FIG. 17, switches (SWs) 171 and 172 are arranged on the control lines from driving units 111 and 112 corresponding to the two carriage motors, respectively. The CPU 101 can individually execute ON/OFF control on each of the switches 171 and 172.

Furthermore, it may be arranged so that the CPU 101 will control the driving units 111 and 112 individually by arranging switches (SWs) 181 and 182 on the power supply lines VM of the driving units 111 and 112 corresponding to the two carriage motors, respectively. In this manner, it is possible to freely implement the motor control arrangement depending on the layout of a pattern, the number of switches, and the like.

By using the motor control arrangement described above, it will be possible to execute a sequence for confirming individual carriage motors as described with reference to FIGS. 14 and 15.

In addition, in each of the embodiments and the modifications described above, it is preferable for a timing belt 7, tubes 73R and 73L, and tube holding members 78R and 78L to be wound around so as to be approximately bilaterally symmetrical to the carriage 3. That is, this indicates a state in which these components are wound to have a bilaterally symmetrical arrangement, upon being viewed from the front and the top direction with respect to the carriage 3 as the origin, when the carriage 3 is positioned at the approximate center of its maximum movement range as shown in FIG. 2. Since this will make the load from the movement of the carriage in the forward direction and the load from the movement of the carriage in the reverse direction be approximately the same, the loads on the carriage motors 104 and 107 arranged on the left side and the right side will also be approximately the same. Driving control can be performed more easily as the outputs from the carriage motors 104 and 107 become more equal, thus improving control responsiveness. Hence, for example, by continuing to use the printing apparatus, it will be possible to maintain an equal output balance between the left and right carriage motors even if the outputs of the carriage motors degrade.

Furthermore, although each of the embodiments and the modifications described above described an example of a printing apparatus that performs printing by reciprocally moving a carriage on which a printhead is mounted, the present invention is not limited to this. The present invention can be applied to, for example, a scanner apparatus that reads an image of an original by reciprocally moving a scanner on which a contact image scanner (CIS) is mounted, a multi-function printer incorporating both this scanner apparatus and the printing apparatus, and the like.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-166108, filed on Sep. 30, 2020, which is hereby incorporated by reference herein in its entirety.

What is claimed is:

1. A printing apparatus comprising:

a carriage configured to reciprocally move in a predetermined direction;

a printhead mounted on the carriage;

a first motor arranged on a side of one end of a range of movement of the carriage and configured to drive the carriage;

a second motor arranged on a side of the other end of the range of movement of the carriage, and configured to drive the carriage;

a detection unit configured to detect a position of the carriage with respect to the predetermined direction;

a control unit configured to generate a first control signal and a second control signal for controlling the first motor and the second motor, respectively, by feeding back a detection result detected by the detection unit;

a first driving unit configured to drive the first motor based on the first control signal output from the first control unit; and a second driving unit configured to drive the second motor based on the second control signal output from the second control unit, wherein the control unit generates the first control signal and the second control signal based on a signal of the detection unit in common and phase information of the first motor which indicates position information of a coil of the first motor, and the first motor and the second motor are driven simultaneously with their output power of a rotation being equal to one another and are brushless DC motors having the same kind of driving characteristics.

2. The apparatus according to claim 1, wherein the control unit obtains phase information of the first motor and the second motor, and controls the first driving unit and the second driving unit.

3. The apparatus according to claim 1, wherein the detection unit includes:

a linear scale arranged to extend in a direction of movement of the carriage and including slits formed at predetermined intervals, and an encoder sensor arranged on the carriage and configured to detect the position of the carriage by moving with the carriage and reading the slits on the linear scale.

4. The apparatus according to claim 1, wherein the first motor and the second motor are stopped by a brake signal output from the control unit.

5. The apparatus according to claim 4, wherein the control unit drives the first motor and the second motor after canceling the stopped state of the first motor and the second motor set by the brake signal.

6. The apparatus according to claim 1, wherein the control unit performs control to move the carriage from an initial first position to a predetermined second position by driving the first motor and the second motor, and determines, based on the control result, whether the carriage is operating normally.

7. The apparatus according to claim 6, wherein the control unit determines whether the first motor is operating normally by driving only the first motor and confirming whether the carriage is operating normally under the control, and the control unit determines whether the second motor is operating normally by driving only the second motor and confirming whether the carriage is operating normally under the control.

8. The apparatus according to claim 7, wherein each of the determination as to whether the carriage is operating normally and the determination as to whether one of the first motor and the second motor is operating normally is performed by confirming, after the start of a motor driving operation, whether the carriage can move a predetermined distance in a predetermined time.

9. The apparatus according to claim 7, wherein each of the determination as to whether the carriage is operating normally and the determination as to whether one of the first motor and the second motor is operating normally is performed by confirming, after the start of a motor driving operation, whether the carriage has reached the second position at a predetermined time.

10. The apparatus according to claim 6, wherein the control unit drives the first motor and the second motor to determine whether the carriage is operating normally under the control.

11. The apparatus according to claim 6, further comprising:

a notification unit configured to notify, based on the result of the determination, a user of an abnormality in the operation of the carriage.

12. The apparatus according to claim 11, wherein the notification unit further notifies the user of an abnormality in one of the first motor and the second motor.

13. The apparatus according to claim 1, wherein one of the first motor and the second motor is made not to operate by a reset signal output from the control unit.

14. The apparatus according to claim 1, further comprising:

a first switch configured to set the driving of the first motor to ON or OFF; and a second switch configured to set the driving of the second motor to ON or OFF, wherein the control unit controls the first switch and the second switch.

15. The apparatus according to claim 1, further comprising:

a first switch and a second switch each configured to set a power supply of a corresponding one of the first and second driving units to ON or OFF, and the control unit performs control to set each of the first switch and the second switch to ON or OFF.

16. The apparatus according to claim 1, wherein when a belt to be connected to the first motor, the second motor, and the carriage and a tube to be attached to the carriage are positioned at an approximate center of a maximum range of movement which can be moved by the carriage, the belt and the tube are wound to be approximately bilaterally symmetrical when viewed from one of the front and top direction with respect to the direction of movement of the carriage.

17. The apparatus according to claim 1, further comprising:

a tube connected to the printhead; and a tube holding member configured to move together with the printhead and to guide the tube.

18. The apparatus according to claim 17, further comprising:

an ink tank configured to supply ink to the printhead, wherein a reference of a position of the carriage is on a side of the ink tank.

19. The apparatus according to claim 1, wherein the first motor and the second motor are driven based on the same PWM duty cycle.

20. A control method of a printing apparatus, the printing apparatus comprising:

a carriage configured to reciprocally move in a predetermined direction;

a printhead mounted on the carriage;

a first motor arranged on a side of one end of a range of movement of the carriage and configured to drive the carriage;

a second motor arranged on a side of the other end of the range of movement of the carriage, and configured to drive the carriage;

a detection unit configured to detect a position of the carriage with respect to the predetermined direction;

a control unit configured to generate a first control signal and a second control signal for controlling the first motor and the second motor, respectively, by feeding back a detection result detected by the detection unit;

a first driving unit configured to drive the first motor based on the first control signal output from the first control unit; and a second driving unit configured to drive the second motor based on the second control signal output from the second control unit, the method comprising:

generating the first control signal and the second control signal based on a signal of the detection unit in common and phase information of the first motor which indicates position information of a coil of the first motor; and driving the first motor and the second motor simultaneously with their output power of a rotation being equal to one another, the first motor and the second motor being brushless DC motors having the same kind of driving characteristics.

* * * * *